(12) United States Patent
Mukawa

(10) Patent No.: US 10,477,174 B2
(45) Date of Patent: Nov. 12, 2019

(54) IMAGE DISPLAY DEVICE AND DISPLAY APPARATUS

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/612,710

(22) Filed: Feb. 3, 2015

(65) Prior Publication Data

US 2015/0229897 A1    Aug. 13, 2015

(30) Foreign Application Priority Data

Feb. 10, 2014 (JP) .................................. 2014-023138

(51) Int. Cl.
| H04N 9/73 | (2006.01) |
| G02B 27/01 | (2006.01) |
| G09G 3/36 | (2006.01) |
| H04N 9/31 | (2006.01) |

(52) U.S. Cl.
CPC ............. H04N 9/73 (2013.01); G02B 27/017 (2013.01); G09G 3/36 (2013.01); H04N 9/3144 (2013.01); G02B 2027/0178 (2013.01)

(58) Field of Classification Search
CPC .................................................. H04N 9/3158
See application file for complete search history.

(56) References Cited

U.S. PATENT DOCUMENTS

| 8,411,134 B2 | 4/2013 | Tomita |
| 8,570,242 B2 | 10/2013 | Chosokabe et al. |
| 8,797,433 B2 | 8/2014 | Kaizu et al. |
| 8,861,090 B2 | 10/2014 | Mukawa |
| 8,907,865 B2 | 12/2014 | Miyawaki et al. |
| 8,976,453 B2 | 3/2015 | Akutsu et al. |
| 8,988,315 B2 | 3/2015 | Mukawa et al. |
| 9,016,864 B2 | 4/2015 | Sasazaki et al. |
| 9,164,221 B2 | 10/2015 | Akutsu et al. |
| 9,201,242 B2 | 12/2015 | Miyawaki et al. |
| 9,311,752 B2 | 4/2016 | Chosokabe et al. |

(Continued)

FOREIGN PATENT DOCUMENTS

| CN | 101639169 A | 2/2010 |
| CN | 102472895 A | 5/2012 |

(Continued)

OTHER PUBLICATIONS

Chinese Office Action dated Mar. 21, 2018 in connection with Chinese Application No. 201510055500X, and English translation thereof.

(Continued)

*Primary Examiner* — Grace Q Li
(74) *Attorney, Agent, or Firm* — Wolf, Greenfield & Sacks, P.C.

(57) ABSTRACT

An image display device includes an image forming unit, an optical unit, a temperature measuring unit, and a control unit. The optical unit is configured to input and output light that is output from the image forming unit. The temperature measuring unit is configured to measure a temperature of the image forming unit. The control unit is configured to control an operation of the image forming unit based on a result of a temperature measurement by the temperature measuring unit.

14 Claims, 13 Drawing Sheets

(56) References Cited

U.S. PATENT DOCUMENTS

| | | | |
|---|---|---|---|
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 9,899,000 B2 | 2/2018 | Takahota et al. | |
| 9,933,621 B2 | 4/2018 | Hirano et al. | |
| 9,952,435 B2 | 4/2018 | Tanaka et al. | |
| 9,972,135 B2 | 5/2018 | Mukawa | |
| 2003/0015697 A1* | 1/2003 | Brophy | H01L 21/8221 257/13 |
| 2008/0079371 A1* | 4/2008 | Kang | H05B 33/0818 315/309 |
| 2009/0274182 A1 | 11/2009 | Morikawa et al. | |
| 2010/0128107 A1 | 5/2010 | Tomita | |
| 2011/0241975 A1 | 10/2011 | Mukawa et al. | |
| 2011/0248904 A1* | 10/2011 | Miyawaki | G02B 27/017 345/7 |
| 2011/0248905 A1 | 10/2011 | Chosokabe et al. | |
| 2012/0044571 A1 | 2/2012 | Mukawa | |
| 2012/0127434 A1 | 5/2012 | Sasazaki et al. | |
| 2012/0218426 A1 | 8/2012 | Kaizu et al. | |
| 2012/0236046 A1* | 9/2012 | Sugiyama | G02B 27/01 345/690 |
| 2012/0250306 A1* | 10/2012 | Sugiyama | B60K 35/00 362/231 |
| 2012/0306940 A1* | 12/2012 | Machida | G02B 6/005 345/690 |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0072004 A1* | 3/2014 | Connolly | H01S 5/141 372/34 |
| 2014/0085190 A1* | 3/2014 | Erinjippurath | G06F 3/012 345/156 |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0347252 A1 | 11/2014 | Miyawaki et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0235620 A1 | 8/2015 | Takahota et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2017/0069140 A1 | 3/2017 | Mukawa | |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |
| 2018/0136472 A1 | 5/2018 | Tanaka et al. | |

FOREIGN PATENT DOCUMENTS

| | | | | |
|---|---|---|---|---|
| CN | 102656501 A | | 9/2012 | |
| CN | 103309035 A | | 9/2013 | |
| CN | 103368060 A | | 10/2013 | |
| EP | 2506573 A2 | | 10/2012 | |
| EP | 2639623 A2 | | 9/2013 | |
| EP | 2674813 A2 | | 12/2013 | |
| EP | 2784578 A1 | | 10/2014 | |
| JP | 2010-301055 A | | 4/1997 | |
| JP | 2011-090076 A | | 5/2011 | |
| JP | 2013-190658 A | | 9/2013 | |
| JP | 2014-013968 A | | 1/2014 | |
| JP | 2014-194500 A | | 10/2014 | |
| KR | 2002094288 A | * | 12/2002 | G09G 3/36 |
| WO | WO 2011/132407 A1 | | 10/2011 | |
| WO | WO 2012/132289 A1 | | 10/2012 | |
| WO | WO 2013/057799 A1 | | 4/2013 | |

OTHER PUBLICATIONS

U.S. Appl. No. 15/867,870, filed Jan. 11, 2018, Tanaka et al.
U.S. Appl. No. 15/925,605, filed Mar. 19, 2018, Mukawa.
Extended European Search Report dated Mar. 19, 2019 in connection with European Application No. 18204973.4.

* cited by examiner

Reflection-type volume holographic diffraction grating         Interference fringe

IMAGE DISPLAY DEVICE AND DISPLAY APPARATUS

CROSS REFERENCE TO RELATED APPLICATIONS

This application claims the benefit of Japanese Priority Patent Application JP 2014-023138 filed Feb. 10, 2014, the entire contents of which are incorporated herein by reference.

BACKGROUND

The present disclosure relates to an image display device and a display apparatus including the image display device. More specifically, the present disclosure relates to a display apparatus used as a head mounted display (HMD), and to an image display device used in the display apparatus.

A virtual image display device (image display device) used in order for an observer to observe a two-dimensional image formed by an image forming unit in an enlarged form by a virtual image optical system is well known from, for example, Japanese Patent Application Laid-open No. Hei 10-301055. The image display device disclosed in Japanese Patent Application Laid-open No. Hei 10-301055 includes, for example, an image output unit, a lens, a holographic optical element (HOE) attached to the surface of the lens, and, as appropriate, a half mirror.

SUMMARY

In such an image display device, depending on a light source provided to an image forming unit, a wavelength of light that is output from the light source may vary due to the heat generation of the light source and, as a result, the image quality of an image observed by an observer may be deteriorated (details of which will be described later). With the HMD disclosed in Japanese Patent Application Laid-open No. Hei 10-301055, however, it is difficult to cope with the deterioration of the image quality of the image, which is due to variations in wavelength of the light that is output from the light source.

So, there is a need for providing an image display device having a configuration and a structure capable of avoiding the deterioration of the image quality of an image, which is due to variations in wavelength of light that is output from a light source, and a display apparatus including such an image display device.

According to an embodiment of the present disclosure, there is provided an image display device including an image forming unit, an optical unit, a temperature measuring unit, and a control unit. The optical unit is configured to input and output light that is output from the image forming unit. The temperature measuring unit is configured to measure a temperature of the image forming unit. The control unit is configured to control an operation of the image forming unit based on a result of a temperature measurement by the temperature measuring unit.

According to another embodiment of the present disclosure, there is provided a display apparatus including a frame mounted onto a head of an observer, and an image display device attached to the frame. The image display device includes an image forming unit, an optical unit, a temperature measuring unit, and a control unit. The optical unit is configured to input and output light that is output from the image forming unit. The temperature measuring unit is configured to measure a temperature of the image forming unit. The control unit is configured to control an operation of the image forming unit based on a result of a temperature measurement by the temperature measuring unit. In other words, the image display device of the display apparatus according to this embodiment of the present disclosure includes the image display device according to the above embodiment of the present disclosure.

Each of the image display device and the display apparatus according to the embodiments of the present disclosure includes the temperature measuring unit configured to measure the temperature of the image forming unit and the control unit configured to control the operation of the image forming unit based on the result of the temperature measurement by the temperature measuring unit. Thus, it is possible to reliably avoid the deterioration of the image quality of an image, which is due to variations in wavelength of light that is output from a light source. It should be noted that the effects described herein are merely exemplary ones and are not limited. Further, additional effects may be produced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
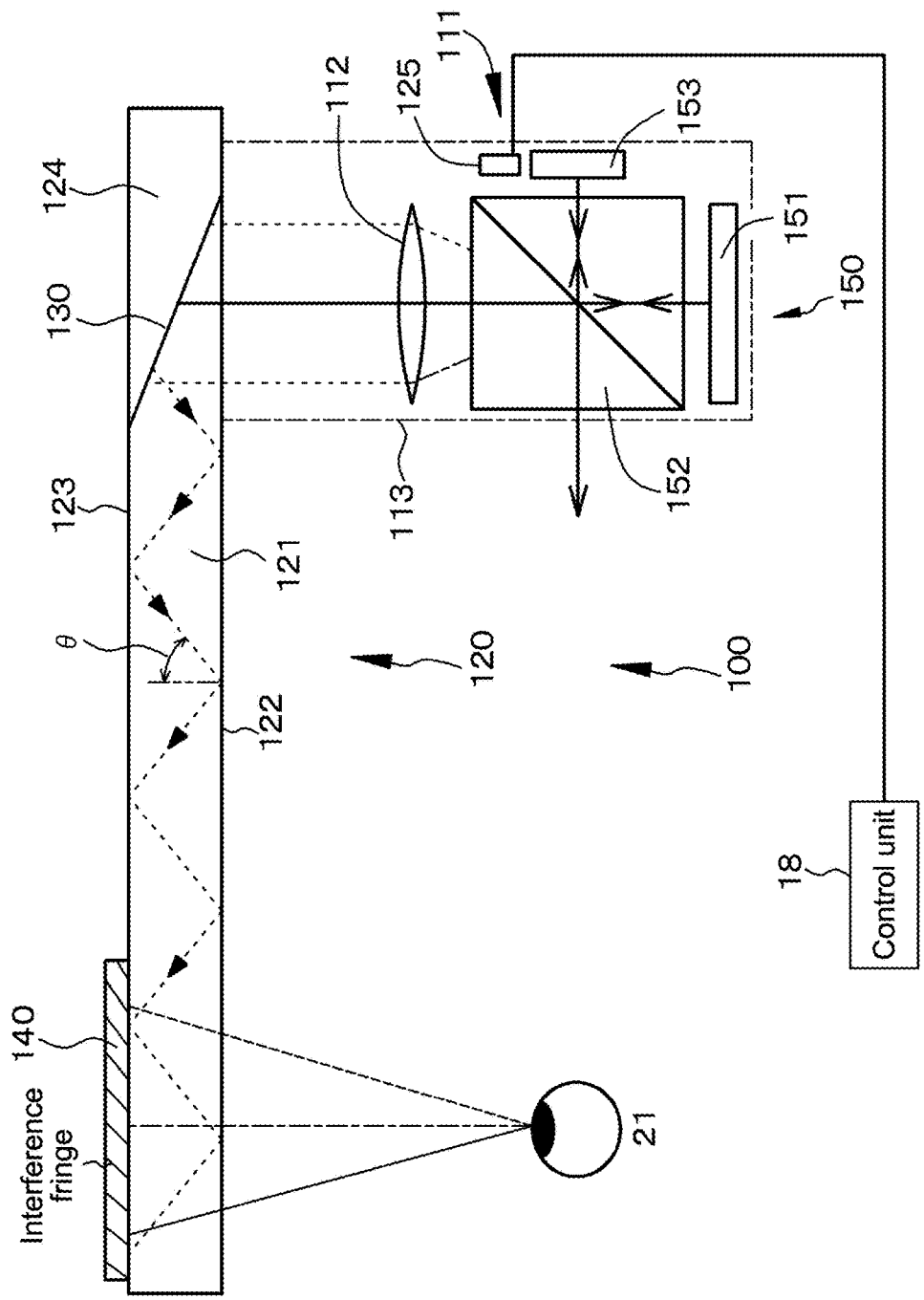
FIG. 1 is a conceptual diagram of an image display device in a display apparatus of Embodiment 1.

Hereinafter, the present disclosure will be described based on embodiments with reference to the drawings but is not limited to the embodiments. Various numerical values and materials in the embodiments are merely exemplary ones. It should be noted that the description is given in the following order.

1. Display Apparatus and Image Display Device According to Embodiment of Present Disclosure and Overall Description 2. Embodiment 1 (Display Apparatus and Image Display Device According to Embodiment of Present Disclosure)

3. Embodiment 2 (Modification of Embodiment 1)

4. Embodiment 3 (Modification of Embodiments 1 and 2)

5. Embodiment 4 (Modification of Embodiments 1 to 3) and Others

Display Apparatus and Image Display Device According to Embodiment of Present Disclosure and Overall Description In an image display device or an image display device in a display apparatus according to an embodiment of the present disclosure (hereinafter, those image display devices are collectively referred to as "image display device and the like according to an embodiment of the present disclosure"), an image forming unit may include a light source including a GaN-based semiconductor laser element (semiconductor laser element formed of a laminate of a GaN-based compound semiconductor layer), a temperature measuring unit may be configured to measure a temperature of the semiconductor laser element, and a control unit may be configured to control a wavelength of the semiconductor laser element. It should be noted that such an image display device and the like according to the embodiment of the present disclosure are referred to as "image display device according to a first embodiment" for convenience sake. Here, in the image display device according to the first embodiment, the control unit may be configured to control a current supplied to the semiconductor laser element to thus control the wavelength of the semiconductor laser element. In such a case, it is desirable that the semiconductor laser element emit green or blue light. In the case of driving the GaN-based semiconductor laser element based on a pulse-width modulation (PWM) method, a pulse height only needs to be controlled.

Alternatively, in the image display device and the like according to the embodiment of the present disclosure, the image forming unit may include a light source including a semiconductor laser element, the temperature measuring unit may be configured to measure a temperature of the semiconductor laser element, and the control unit may be configured to control an output position of the light from the image forming unit. It should be noted that such an image display device and the like according to the embodiment of the present disclosure are referred to as "image display device according to a second embodiment" for convenience sake. Here, in the image display device according to the second embodiment, it is desirable that the semiconductor laser element emit red light, but the semiconductor laser element is not limited thereto and may emit green or blue light.

Alternatively, in the image display device and the like according to the embodiment of the present disclosure, the image forming unit may include a light source including a semiconductor laser element, the temperature measuring unit may be configured to measure a temperature of the semiconductor laser element, and the control unit may be configured to transmit a signal for compensating for a distortion to the image forming unit, the distortion being caused in an image output from the optical unit.

In the image display device and the like according to the embodiment of the present disclosure including various desirable embodiments described above, the optical unit may include (a) a light guide plate configured to output light after input light is propagated inside the light guide plate by total reflection, (b) a first deflection unit including a reflecting mirror or a semi-transmissive mirror and configured to deflect at least part of the light input to the light guide plate, to totally reflect the light input to the light guide plate inside the light guide plate, and (c) a second deflection unit including a diffraction grating member and configured to deflect the light propagated inside the light guide plate by total reflection, to output, from the light guide plate, the light propagated inside the light guide plate by total reflection. Here, the term "total reflection" means internal total reflection or total reflection caused inside the light guide plate.

The temperature measuring unit may be formed of a well-known temperature measuring unit such as a thermocouple, a temperature measuring resistor, a thermistor, and an IC temperature sensor.

In the display apparatus according to the embodiment of the present disclosure including various desirable embodiments described above, the optical unit may be transmissive or semi-transmissive (see-through).

Specifically, a part of the optical unit, which is opposed to at least the pupil of an observer, can be made transmissive or semi-transmissive (see-through), and a landscape can be viewed through the part of the optical unit. The display apparatus may include one image display device or two image display devices.

In this specification, the term "semi-transmissive" is used. This term is used in not a meaning that ½ (50%) of incident light is transmitted or reflected, but a meaning that part of incident light is transmitted and the rest is reflected.

In the case where the first deflection unit reflects all of the light input to the light guide plate, the first deflection unit may be made of metal including an alloy, for example, and formed of a light reflecting film (a kind of mirror) that reflects the light input to the light guide plate. Further, in the case where the first deflection unit reflects part of the light input to the light guide plate, the first deflection unit may be formed of a multi-layer lamination structure in which many dielectric lamination films are laminated, a half mirror, and a polarizing beam splitter, for example. In the first deflection unit, in order that parallel light input to the light guide plate is totally reflected inside the light guide plate, at least part of the parallel light input to the light guide plate is reflected. On the other hand, in the second deflection unit, the parallel light that is propagated inside the light guide plate by total reflection is diffracted and reflected a plurality of times and output from the light guide plate in the state of parallel light. The second deflection unit may be formed of a diffraction grating member. Further, the diffraction grating member may be formed of a reflection-type diffraction grating element or a transmissive-type diffraction grating element. It should be noted that examples of the reflection-type diffraction grating element include a reflection-type volume holographic diffraction grating.

The image display device and the like according to the embodiment of the present disclosure allow monochrome (for example, green) image display. In the case of color image display, however, in order to correspond to diffraction reflection of P types of light beams having different P types (for example, P=3, i.e., three types of red, green, and blue) of wavelength bands (or wavelengths), the diffraction grating member may be formed of a laminate of P diffraction grating layers formed of diffraction gratings. For each of the diffraction grating layers, an interference fringe corresponding to one type of wavelength band (or wavelength) is formed. Alternatively, in order to correspond to diffraction reflection of P types of light beams having different P types of wavelength bands (or wavelengths), the diffraction grating member formed of one diffraction grating layer may also be provided with P types of interference fringes. Alternatively, the angle of view may be divided into three, for example, and the diffraction grating member may be formed of a laminate of the diffraction grating layers corresponding to the respective angles of view. Alternatively, for example, the following structure may be adopted: a diffraction grating member formed of a diffraction grating layer formed of a reflection-type volume holographic diffraction grating that causes light having a red wavelength band (or wavelength) to be diffracted and reflected is disposed on a first light guide plate; a diffraction grating member formed of a diffraction grating layer formed of a reflection-type volume holographic diffraction grating that causes light having a green wavelength band (or wavelength) to be diffracted and reflected is disposed on a second light guide plate; a diffraction grating member formed of a diffraction grating layer formed of a reflection-type volume holographic diffraction grating that causes light having a blue wavelength band (or wavelength) to be diffracted and reflected is disposed on a third light guide plate; and those first light guide plate, second light guide plate, and third light guide plate are laminated with gaps therebetween. Adopting those configurations allows an increase in diffraction efficiency, an increase in diffraction reception angle, and optimization of diffraction angle, when light beams having respective wavelength bands (or wavelengths) are diffracted and reflected in the diffraction grating member. It is desirable to dispose a protector such that the reflection-type volume holographic diffraction grating does not come into direct contact with air.

Examples of material forming the diffraction grating member include a photopolymer material. A constituent material and a basic structure of the diffraction grating member formed of the reflection-type volume holographic diffraction grating may be the same as those of a reflection-type volume holographic diffraction grating in related art. The reflection-type volume holographic diffraction grating means a holographic diffraction grating that diffracts and reflects only positive first-order diffracted light. Although an interference fringe is formed inside and over the surface of the diffraction grating member, a method of forming the interference fringe may be the same as a forming method in related art. Specifically, for example, object light may be applied to a member (for example, photopolymer material) that forms a diffraction grating member from a first predetermined direction on one side, and reference light may be applied to the member that forms the diffraction grating member from a second predetermined direction on the other side at the same time, to record an interference fringe formed by the object light and the reference light in the member that forms the diffraction grating member. When the first predetermined direction, the second predetermined direction, and the wavelengths of the object light and the reference light are adequately selected, a desired pitch of interference fringes on the surface of the diffraction grating member and a desired angle of inclination (slant angle) of the interference fringes can be obtained. The angle of inclination of the interference fringe means an angle formed by the surface of the diffraction grating member (or diffraction grating layer) and the interference fringe. In the case where the diffraction grating member is formed of a laminate structure of the P diffraction grating layers of the reflection-type volume holographic diffraction gratings, in order to laminate such diffraction grating layers, P diffraction grating layers only need to be independently produced and then laminated on (bonded to) each other with use of an ultraviolet curable adhesive, for example.

Alternatively, P diffraction grating layers may be produced by producing one diffraction grating layer with use of a photopolymer material having viscosity and then sequentially attaching the photopolymer materials having viscosity thereto, to produce the diffraction grating layer.

In the image display device and the like according to the embodiment of the present disclosure including the various desirable embodiments and configurations described above, the image display device may include a plurality of pixels arranged in a two-dimensional matrix. It should be noted that the image forming unit having such a configuration is referred to as an "image forming unit having a first configuration" for convenience sake.

Examples of the image forming unit having a first configuration include: an image forming unit including a reflection-type spatial light modulation device and a light source; an image forming unit including a transmissive-type spatial light modulation device and a light source; and an image forming unit including a semiconductor laser element. Of those, it is desirable to use an image forming unit including a reflection-type spatial light modulation device and a light source. Examples of the spatial light modulation device include a light valve, for example, a transmissive-type or reflection-type liquid crystal display unit such as an LCOS (Liquid Crystal On Silicon), and a digital micromirror device (DMD). Examples of the light source include the semiconductor laser element as described above. Further, the reflection-type spatial light modulation device may include a liquid crystal display unit and a polarizing beam splitter. The polarizing beam splitter reflects part of light from the light source and guides the light to the liquid crystal display unit, and causes part of the light reflected by the liquid crystal display unit to pass therethrough to guide the light to an optical system. Examples of the light source may include a red light-emitting semiconductor laser element, a green light-emitting semiconductor laser element, and a blue light-emitting semiconductor laser element. Alternatively, red laser light, green laser light, and blue laser light that are output from the red light-emitting semiconductor laser element, the green light-emitting semiconductor laser element, and the blue light-emitting semiconductor laser element, respectively, may be used to achieve color mixture and uniformity in luminance by using a light pipe, to thus obtain white light. The number of pixels may be determined based on the specifications requested for the image display device and exemplified as specific values such as 320*240, 432*240, 640*480, 1024*768, and 1920*1080.

Alternatively, in the image display device according to the embodiment of the present disclosure including the various desirable embodiments and configurations described above, the image display device may include a light source and a scanning unit configured to scan parallel light output from the light source. It should be noted that the image forming unit having such a configuration is referred to as an "image forming unit having a second configuration" for convenience sake.

Examples of the light source in the image forming unit having a second configuration include a semiconductor laser element as described above, specifically, the red light-emitting semiconductor laser element, the green light-emitting semiconductor laser element, and the blue light-emitting semiconductor laser element. Alternatively, red laser light, green laser light, and blue laser light that are output from the red light-emitting semiconductor laser element, the green light-emitting semiconductor laser element, and the blue light-emitting semiconductor laser element, respectively, may be used to achieve color mixture and uniformity in luminance by using a light pipe, to thus obtain white light. The number of pixels (virtual pixels) in the image forming unit having a second configuration may also be determined based on the specifications requested for the image display device and exemplified as specific values such as 320*240, 432*240, 640*480, 1024*768, and 1920*1080. Further, in the case of color image display and in the case where the light source includes the red light-emitting semiconductor laser element, the green light-emitting semiconductor laser element, and the blue light-emitting semiconductor laser element, for example, it is desirable to perform color composition by using a cross prism. Examples of the scanning unit include MEMS (Micro Electro Mechanical Systems) including a micromirror that is rotatable in two-dimensional directions and horizontally and vertically scans light output from the light source, and a galvanometer mirror.

In the image forming unit having a first configuration or the image forming unit having a second configuration, the light that is changed into a plurality of parallel light beams in the optical system is input to the light guide plate. Such an optical system is an optical system in which output light is assumed as parallel light and which is referred to as a "parallel light outputting optical system" in some cases, and specifically, includes a collimating optical system or a relay optical system. In such a manner, being parallel light is requested based on the necessity to preserve light wavefront information obtained when those light beams are input to the light guide plate, even after those light beams are output from the light guide plate via the first deflection unit and the second deflection unit. In order to generate a plurality of parallel light beams, specifically, for example, a light output unit of the image forming unit may be provided at a spot (position) of the focal distance in the parallel light outputting optical system, for example. The parallel light outputting optical system has a function of converting position information of a pixel into angle information in the optical system of the optical unit. Examples of the parallel light outputting optical system include an optical system that includes a convex lens, a concave lens, a free-form-surface prism, and a hologram lens independently or in combination and has a positive optical power as a whole. A light blocking unit having an opening may be disposed between the parallel light outputting optical system and the light guide plate so as to prevent undesired light from being output from the parallel light outputting optical system and input to the light guide plate.

The light guide plate has two parallel surfaces (first surface and second surface) extending parallel to the axis (X axis) of the light guide plate. Assuming that a surface of the light guide plate, to which light is input, is an input surface of the light guide plate, and a surface of the light guide plate, from which light is output, is an output surface of the light guide plate, the input surface of the light guide plate and the output surface of the light guide plate may be formed of the first surface. Alternatively, the input surface of the light guide plate may be formed of the first surface, and the output surface of the light guide plate may be formed of the second surface. Examples of the material forming the light guide plate include glasses including an optical glass such as a quartz glass or BK7, and plastic materials (for example, PMMA (poly methyl methacrylate), polycarbonate resin, acrylic resin, amorphous polypropylene resin, and styrene resin including AS resin (acrylonitrile styrene copolymer)). The shape of the light guide plate is not limited to be flat and may be curved.

In the display apparatus according to the embodiment of the present disclosure, a frame includes a front portion disposed on the front of an observer, and two temple portions turnably attached to both ends of the front portion via hinges. It should be noted that earpiece portions are attached to the tip ends of the respective temple portions. The image display device is attached to the frame. Specifically, for example, the image forming unit only needs to be attached to the temple portion. Further, a configuration in which the front portion and the two temple portions are incorporated may be adopted. In other words, when the whole of the display apparatus according to the embodiment of the present disclosure is viewed, generally, the frame has substantially the same structure as that of normal eyeglasses. The materials forming the frame including a pad portion may be the same as materials forming normal eyeglasses, such as metals, alloys, plastics, and combinations thereof. Furthermore, a configuration in which nose pads are attached to the front portion may be adopted. In other words, when the whole of the display apparatus according to the embodiment of the present disclosure is viewed, an assembled body of the frame and the nose pads has substantially the same structure as that of normal eyeglasses, except for the absence of a rim. The nose pads may have a well-known configuration and structure.

Besides, in the display apparatus according to the embodiment of the present disclosure, it is desirable to adopt the following form from the viewpoint of design or ease of mounting: wires (signal line, power supply line, etc.) extending from one or two image forming units are extended from the tip ends of the earpiece portions to the outside through the inside of the temple portions and the earpiece portions and are connected to a control unit (control circuit). Further, it is also possible to adopt the following form: each image forming unit includes a headphone portion and a headphone portion wire, which extends from each image forming unit, is extended from the tip end of the earpiece portion to the headphone portion through the inside of the temple portion and the earpiece portion. Examples of the headphone portion include an inner ear type headphone portion and a canal type headphone portion. More specifically, it is desirable to adopt a form in which the headphone portion wire is extended to the headphone portion so as to run around the rear side of a pinna (auricle) from the tip end of the earpiece portion.

The imaging device may be attached to the center part of the front portion. Specifically, the imaging device includes a solid-state imaging device, which has a CCD (Charge Coupled Device) or a CMOS (Complementary Metal Oxide Semiconductor) sensor, and a lens, for example. The wiring from the imaging device only needs to be connected to one image display device (or image forming unit) via the front portion for example, and only needs to be further included in wiring extending from the image display device (or image forming unit).

A light beam that is output from the center of the image forming unit and passes through a nodal point on the image forming unit side of the optical system is referred to as a "central light beam", and a light beam in the central light beam, which is vertically input to the optical unit, is referred to as a "central incident light beam". It is assumed that a point at which the central incident light beam is input to the optical unit is an optical unit central point, an axis that passes through the optical unit central point and is parallel to the axis direction of the optical unit is an X axis, and an axis that passes through the optical unit central point and coincides with the normal line of the optical unit is a Y axis. The horizontal direction in the display apparatus according to the embodiment of the present disclosure is a direction that is parallel to the X axis, and is hereinafter referred to as an "X-axis direction" in some cases. Here, the optical system is disposed between the image forming unit and the optical unit and changes light output from the image forming unit into parallel light. Subsequently, a light flux changed into the parallel light in the optical system is input to the optical unit, guided to the optical unit, and output from the optical unit. Further, the central point of the first deflection unit is referred to as an "optical unit central point".

The display apparatus according to the embodiment of the present disclosure including the various modifications described above may be available for displaying various types of descriptions about how to drive, operate, maintain, or disassemble an observation target (subject) such as a variety of devices, and symbols, codes, marks, emblems, patterns, and the like; for displaying various types of descriptions about an observation target (subject) such as people and products, and symbols, codes, marks, emblems, patterns, and the like; for displaying moving and still images; for displaying subtitles in movies and the like; for displaying descriptions about video or closed captions in synchronization with video display; for displaying descriptions about an observation target (subject) in acting performances, Kabuki, Noh, Kyogen, Operas, music recitals, ballet, various types of theater plays, amusement parks, art museums, tourist attractions, tourist spots, and sightseeing signs, and the details of story, the progress of story, the background of story, and the like; and for displaying closed captions. It should be noted that various types of details described above correspond to information that support data on the subject. For acting performances, Kabuki, Noh, Kyogen, Operas, music recitals, ballet, various types of theater plays, amusement parks, art museums, tourist attractions, tourist spots, sightseeing signs, and the like, the display apparatus may display characters as images related to an observation target whenever appropriate. Specifically, an image control signal is transmitted to the display apparatus and images are displayed in the display apparatus based on the progress of story in movies or in acting performances, based on a predetermined schedule and time allocation, in response to an operator's operation under the control of a computer or the like, for example. For display of various types of descriptions about observation targets (subjects) such as various types of devices, people, and products, the observation targets (subjects) such as various types of devices, people, and products may be imaged using an imaging device, and the imaged details may be analyzed in the display apparatus. In this manner, the display apparatus may be able to display various types of descriptions created in advance about the observation targets (subjects) such as various types of devices, people, and products. Alternatively, the display apparatus according to the embodiment of the present disclosure may be used as a stereoscopic display apparatus. In this case, a polarizer plate or polarizer film may be detachably provided to the optical unit, or bonded to the optical unit, as appropriate.

An image signal supplied to the image forming unit includes not only an image signal (for example, character data) but also luminance data (luminance information) on images to be displayed, chromaticity data (chromaticity information), or both the luminance data and the chromaticity data, for example. The luminance data may be luminance data corresponding to the luminance at a predetermined area including an observation target viewed through the optical unit, and the chromaticity data may be chromaticity data corresponding to the chromaticity at the predetermined area including the observation target viewed through the optical unit. With an image signal including such luminance data on images, the images to be displayed become controllable in terms of luminance (brightness), and with an image signal including such chromaticity data on images, the images to be displayed become controllable in terms of chromaticity (color). Moreover, with an image signal including such luminance and chromaticity data on images, the images to be displayed become controllable in terms of both luminance (brightness) and chromaticity (color). When the luminance data in use corresponds to the luminance at a predetermined area including an observation target viewed through the image display device, the luminance data may be adjusted in value to increase the luminance of an image to be displayed, i.e., to make the image brighter when it is displayed, if the luminance at the predetermined area including the observation target viewed through the image display device is increased. When the chromaticity data in use corresponds to the chromaticity at the predetermined area including the observation target viewed through the image display device, the chromaticity data may be adjusted in value to obtain, roughly, a complementary color relationship between the chromaticity at the predetermined area including the observation target viewed through the image display device and the chromaticity of an image to be displayed. The complementary colors mean a pair of colors that are opposite to each other on the color circle, e.g., red and green, yellow and purple, and blue and orange. The complementary colors also mean a pair of colors that produce a color with reduced chroma when mixed in appropriate proportions, e.g., white for light, and black for objects. However, the complementary characteristics are not the same in terms of visual effects when the colors are placed next to each other, and when the colors are mixed together. The complementary colors are also referred to as antagonistic colors, contrast colors, or opposing colors. Herein, the expression of "opposing colors" directly identifies which colors are opposite to each other, whereas the expression of "complementary colors" identifies colors in a rather wider scope. The pair of complementary colors produces synergistic effects of enhancing their respective colors, and this is called complementary color harmony.

Embodiment 1

Figure 2:
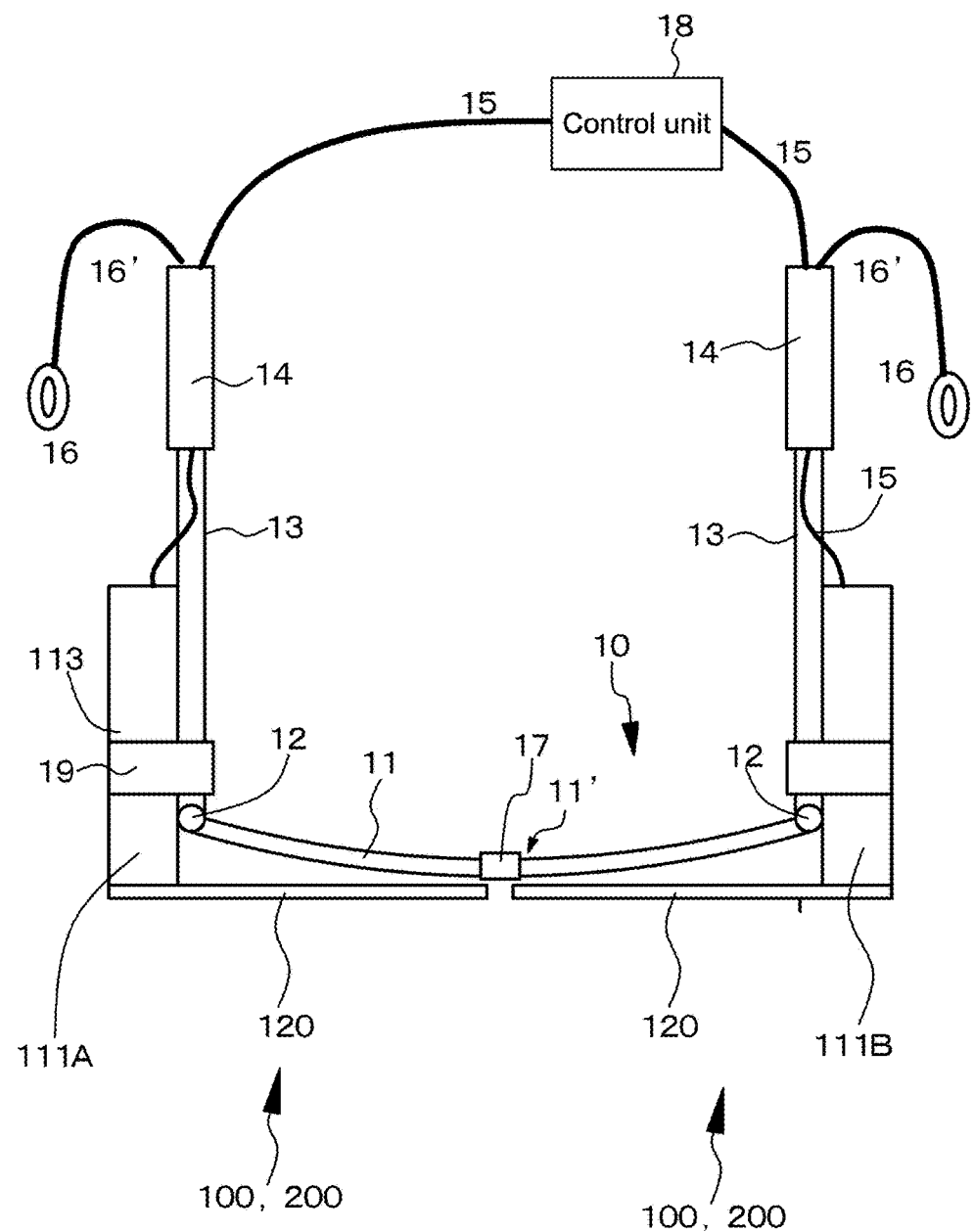
FIG. 2 is a schematic diagram of the display apparatus of Embodiment 1 when viewed from above.
Figure 3:
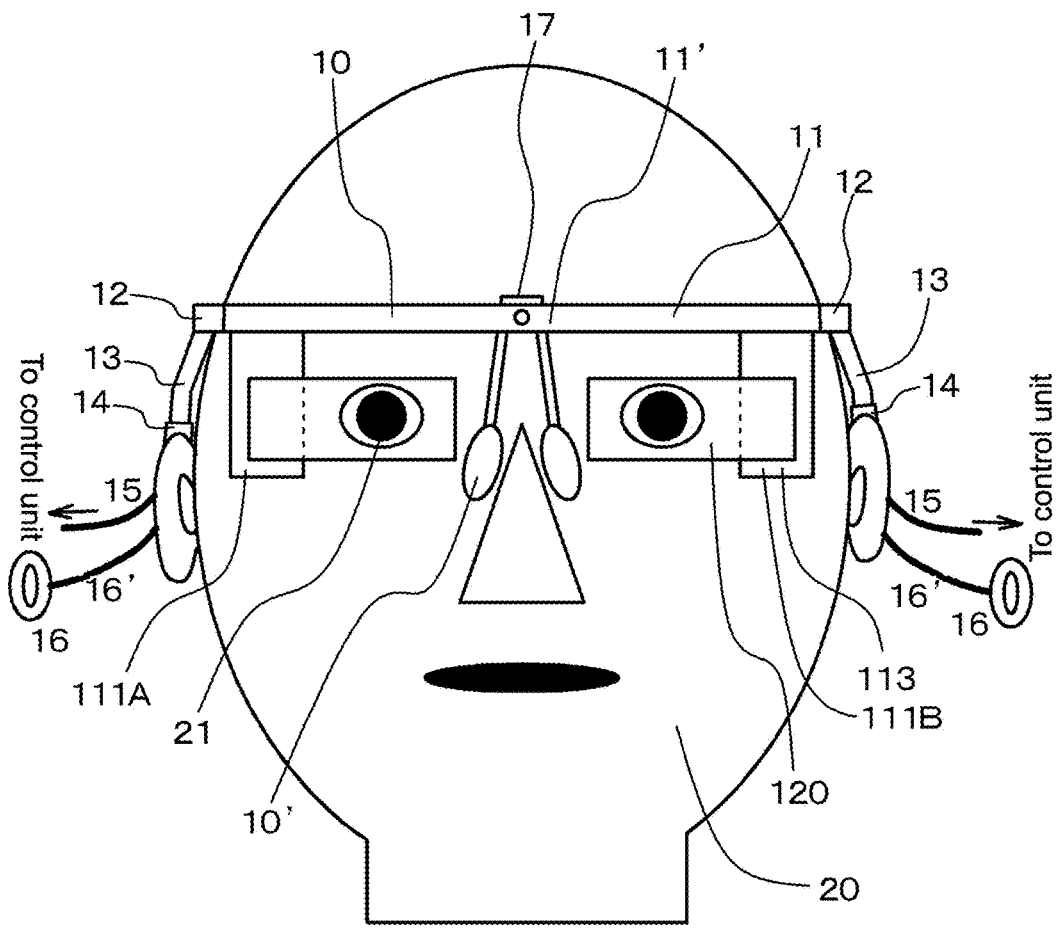
FIG. 3 is a schematic diagram of the display apparatus of Embodiment 1 when viewed from the front.
Figure 4A:
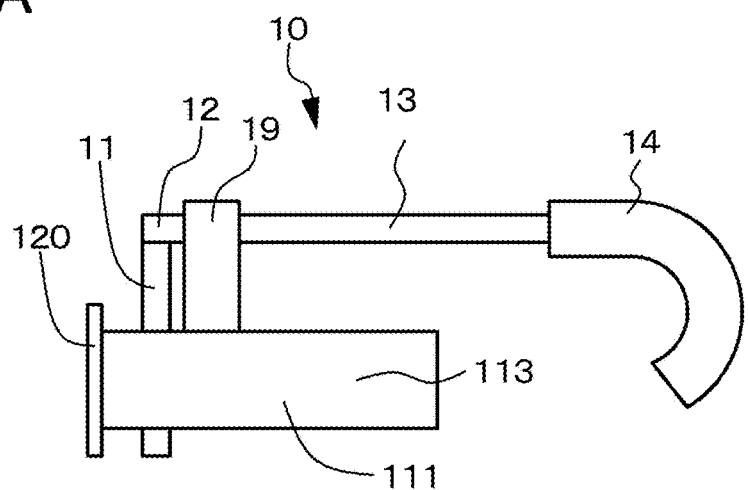
FIGS. 4A and 4B are a schematic diagram of the display apparatus of Embodiment 1 when viewed from a lateral direction and a schematic cross-sectional diagram of a reflection-type volume holographic diffraction grating in a partially enlarged form, respectively.
Figure 4B:
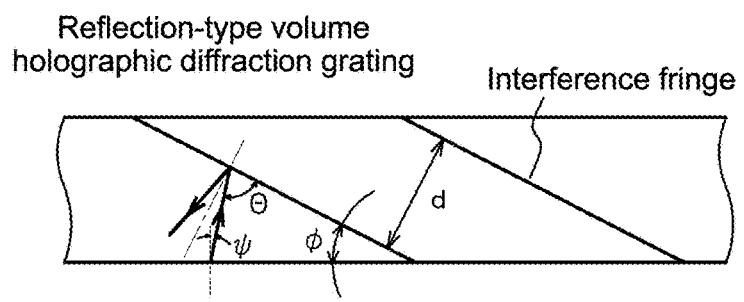
Figure 5:
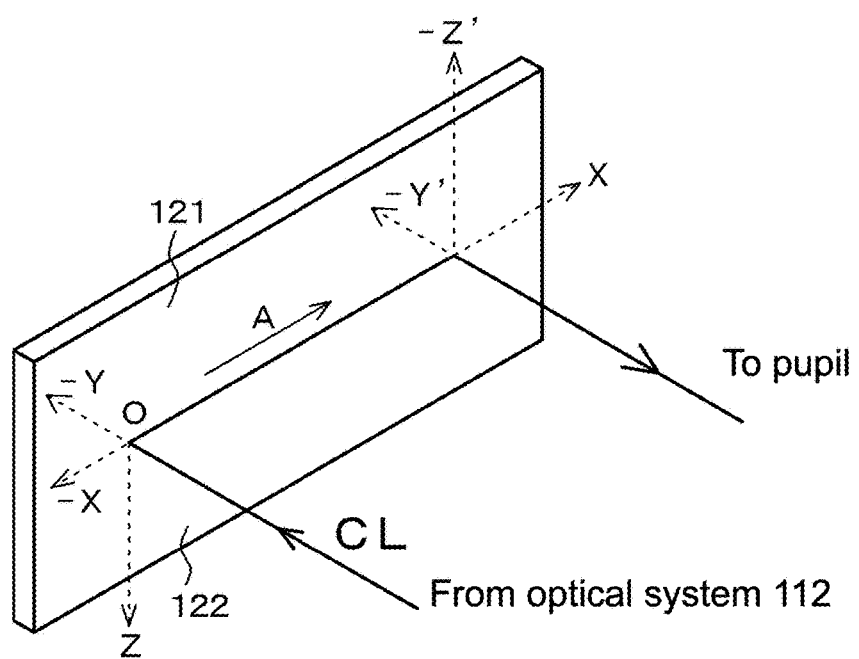
FIG. 5 is a schematic diagram showing light propagation in a light guide plate that forms an image display device.

Embodiment 1 relates to a display apparatus (specifically, head mounted display (HMD)) and an image display device according to an embodiment of the present disclosure, and specifically, to the image display device according to the first embodiment. FIG. 1 is a conceptual diagram of an image display device in a display apparatus of Embodiment 1. FIG. 2 is a schematic diagram of the display apparatus of Embodiment 1 when viewed from above. FIG. 3 is a schematic diagram of the display apparatus of Embodiment 1 when viewed from the front. FIG. 4A is a schematic diagram of the display apparatus of Embodiment 1 when viewed from a lateral direction. FIG. 4B is a schematic cross-sectional diagram of a reflection-type volume holographic diffraction grating in a partially enlarged form. FIG. 5 is a schematic diagram showing light propagation in a light guide plate that forms the image display device.

More specifically, the display apparatus according to Embodiment 1 or Embodiments 2 to 4 that will be described later is a head mounted display (HMD) including (i) a frame (for example, eyeglasses-type frame 10) mounted onto a head of an observer, and (ii) an image display device 100, 200, or 300 attached to the frame 10. Specifically, the display apparatus according to Embodiment 1 or Embodiments 2 to 4 that will be described later is of a binocular type including two image display devices, but may be of a monocular type including one image display device.

Further, each of the image display devices 100 and 200 according to Embodiment 1 and Embodiments 2 and 3 that will be described later includes (A) an image forming unit 111 or 211, (B) an optical unit (light guide unit) 120 configured to input and output light that is output from the image forming unit 111 or 211, (C) a temperature measuring unit 125 configured to measure a temperature of the image forming unit 111 or 211, (D) a control unit 18 configured to control an operation of the image forming unit based on a result of a temperature measurement by the temperature measuring unit 125, and (E) an optical system (parallel light outputting optical system) 112 or 254 configured to change light output from the image forming unit 111 or 211 into parallel light, in which a light flux changed into the parallel light in the optical system 112 or 254 is input to the optical unit 120 and output therefrom.

The image display device 100, 200, or 300 may be attached to the frame in a fixed manner or detachably. Here, the optical system 112 or 254 is disposed between the image forming unit 111 or 211 and the optical unit 120. The light flux changed into the parallel light in the optical system 112 or 254 is input to the optical unit 120 and output therefrom. Further, the optical unit 120 is a semi-transmissive type (see-through type). Specifically, portions of the optical units, which are opposed to at least the both eyes of the observer (more specifically, light guide plate 121 and second deflection unit 140 that will be described later), are semi-transmissive (see-through).

In Embodiment 1 or Embodiments 2 and 3 that will be described later, in a light beam (central incident light beam CL) that is output from the center of the image forming unit 111 or 211 and passes through a nodal point on the image forming unit side of the optical system 112 or 254, it is assumed that a point at which the central incident light beam vertically input to the optical unit 120 is input to the optical unit 120 is an optical unit central point O, an axis that passes through the optical unit central point O and is parallel to the axis direction of the optical unit 120 is an X axis, and an axis that passes through the optical unit central point O and coincides with the normal line of the optical unit 120 is a Y axis. It should be noted that the central point of the first deflection unit 130 is the optical unit central point O. In other words, as shown in FIG. 5, in the image display device 100 or 200, the central incident light beam CL that is output from the center of the image forming unit 111 or 211 and passes through a nodal point on the image forming unit side of the optical system 112 or 254 vertically impinges on the light guide plate 121. In other words, the central incident light beam CL is input to the light guide plate 121 at an incident angle of 0 degrees. In this case, the center of the displayed image coincides with a direction of a perpendicular of a first surface 122 of the light guide plate 121.

The optical unit 120 in Embodiment 1 or Embodiments 2 and 3 that will be described later includes (a) a light guide plate 121 configured to output light after input light is propagated inside the light guide plate by total reflection, (b) a first deflection unit 130 including a reflecting mirror or a semi-transmissive mirror and configured to deflect at least part of the light input to the light guide plate 121, to totally reflect the light input to the light guide plate 121 inside the light guide plate 121, and (c) a second deflection unit 140 including a diffraction grating member and configured to deflect the light propagated inside the light guide plate 121 by total reflection, to output, from the light guide plate 121, the light propagated inside the light guide plate 121 by total reflection. Here, specifically, the second deflection unit 140 is formed of a reflection-type volume holographic diffraction grating.

In Embodiment 1 or Embodiment 2 that will be described later, the image forming unit 111 includes a light source 153 formed of a GaN-based semiconductor laser element, the temperature measuring unit 125 is configured to measure a temperature of the semiconductor laser element, and the control unit 18 is configured to control a wavelength of the semiconductor laser element. It should be noted that the control unit 18 is configured to control a current supplied to the semiconductor laser element, to thus control the wavelength of the semiconductor laser element. The semiconductor laser element emits green or blue light. In other words, each of the image forming units 111 and 211 displays a monochrome (for example, green) image. In the case of driving the GaN-based semiconductor laser element based on a pulse-width modulation (PWM) method, a pulse height only needs to be controlled.

In Embodiment 1 or Embodiments 2 to 4 that will be described later, the temperature measuring unit 125 is formed of a well-known temperature measuring unit such as a thermocouple, a temperature measuring resistor, a thermistor, and an IC temperature sensor.

In Embodiment 1 or Embodiments 2 and 3 that will be described later, the first deflection unit 130 is disposed inside the light guide plate 121, and the second deflection unit 140 is disposed on the surface of the light guide plate 121 (specifically, on a second surface 123 of the light guide plate 121). The first deflection unit 130 reflects at least part of the light input to the light guide plate 121, and the second deflection unit 140 diffracts and reflects the light propagated inside the light guide plate 121 by total reflection a plurality of times and outputs the light in the state of parallel light from the first surface 122 of the light guide plate 121. In other words, in the first deflection unit 130, in order that the parallel light input to the light guide plate 121 is totally reflected inside the light guide plate 121, the parallel light input to the light guide plate 121 is reflected. On the other hand, in the second deflection unit 140, the parallel light that is propagated inside the light guide plate 121 by total reflection is diffracted and reflected a plurality of times and output from the light guide plate 121 toward the pupil 21 of the observer in the state of parallel light.

More specifically, the first deflection unit 130 provided inside the light guide plate 121 is made of aluminum (Al), for example, and is formed of a light reflecting film (a kind of mirror) that reflects the light input to the light guide plate 121. The first deflection unit 130 may be formed by cutting out a portion 124 in which the first deflection unit 130 of the light guide plate 121 is to be provided, providing a slope on which the first deflection unit 130 is to be provided to the light guide plate 121, performing vacuum deposition on the slope to obtain a light reflecting film, and then bonding the cut-out portion 124 of the light guide plate 121 to the first deflection unit 130.

On the other hand, the second deflection unit 140 is formed of a diffraction grating element, specifically, a reflection-type diffraction grating element, and more specifically, a reflection-type volume holographic diffraction grating. In Embodiment 1 or Embodiments 2 and 3 that will be described later, the second deflection unit 140 is formed of a laminate of one diffraction grating layer. It should be noted that the diffraction grating layer made of a photopolymer material is provided with the interference fringe corresponding to one kind of wavelength band (or wavelength) and is produced by a method in related art. The pitch of the interference fringe formed in the diffraction grating layer (diffraction optical element) is constant, and the interference fringe is linear and parallel to the Z axis. It should be noted that the axis of the second deflection unit 140 is parallel to the X axis, and the normal line is parallel to the Y axis. The second deflection unit 140 is disposed on (bonded to) the second surface 123 of the light guide plate 121.

FIG. 4B is a schematic cross-sectional diagram of a reflection-type volume holographic diffraction grating in a partially enlarged form. In the reflection-type volume holographic diffraction grating, an interference fringe having an angle of inclination φ is formed. Here, the angle of inclination φ means an angle formed by the surface of the reflection-type volume holographic diffraction grating and the interference fringe. The interference fringe is formed inside and over the surface of the reflection-type volume holographic diffraction grating. The interference fringe satisfies a Bragg's condition. Here, the Bragg's condition indicates a condition that satisfies the following expression (A), where m represents a positive integer, λ represents a wavelength, d represents a pitch of a lattice plane (intervals of normal line direction of the virtual plane including the interference fringe), and θ represents a complementary angle of the incident angle to the interference fringe. Further, a relationship among θ, an angle of inclination φ, and an incident angle ψ when light enters the diffraction grating member at the incident angle ψ is expressed by the following expression (B).

$$m \cdot \lambda = 2 \cdot d \cdot \sin(\theta) \quad (A)$$

$$\theta = 90° - (\varphi + \psi) \quad (B)$$

In the light guide plate 121, the parallel light is propagated inside the light guide plate 121 by total reflection and then output therefrom. At that time, since the light guide plate 121 is thin and an optical path travelling inside the light guide plate 121 is long, the number of times the total reflection occurs until the light reaches the second deflection unit 140 differs depending on each angle of view. More specifically, in the parallel light that is input to the light guide plate 121, the number of reflections of the parallel light that is input at an angle of a direction approaching the second deflection unit 140 is smaller than the number of reflections of the parallel light that is input to the light guide plate 121 at an angle of a direction moving apart from the second deflection unit 140. This is because parallel light that is reflected in the first deflection unit 130 and is input to the light guide plate 121 at an angle of a direction approaching the second deflection unit 140 has a smaller angle formed together with the normal line of the light guide plate 121 when the light propagated inside the light guide plate 121 impinges on the internal surface of the light guide plate 121, than parallel light that is input to the light guide plate 121 at an angle of a direction opposite to the direction approaching the second deflection unit 140.

In Embodiment 1 or Embodiments 2 and 3 that will be described later, the light guide plate 121 is made of an optical glass or a plastic material. In Embodiment 1 or Embodiments 2 and 3 that will be described later, the light guide plate 121 includes two parallel surfaces (first surface 122 and second surface 123) extending parallel to a light propagation direction (X axis) by internal total reflection of the light guide plate 121. The first surface 122 and the second surface 123 are opposed to each other. Parallel light is input from the first surface 122 that corresponds to a light input surface, and is output from the first surface 122 that corresponds to a light output surface, after being propagated inside the light guide plate 121 by total reflection. It should be noted that the light guide plate 121 is not limited to this configuration, and the light input surface may be formed of the second surface 123, and the light output surface may be formed of the first surface 122.

In Embodiment 1, the image forming unit 111 is an image forming unit having a first configuration and includes a plurality of pixels arranged in a two-dimensional matrix. Specifically, the image forming unit 111 includes a reflection-type spatial light modulation device 150 and a light source 153 formed of a GaN-based semiconductor laser element. The entire image forming unit 111 is housed in a casing 113 (in FIG. 1, indicated by alternate long and short dash line). Such a casing 113 is provided with an opening (not shown), and light is output through the opening from an optical system (parallel light outputting optical system, collimating optical system) 112. The reflection-type spatial light modulation device 150 includes a liquid crystal display unit (LCD) 151 formed of an LCOS as a light valve, and a polarizing beam splitter 152. The polarizing beam splitter 152 reflects part of light from the light source 153 and guides the light to the liquid crystal display unit 151, and transmits part of the light reflected by the liquid crystal display unit 151 and guides the light to the optical system 112. The liquid crystal display unit 151 includes a plurality of (for example, 640*480) pixels (liquid crystal cells) arranged in a two-dimensional matrix. The polarizing beam splitter 152 has a well-known configuration and structure. Non-polarized light output from the light source 153 impinges on the polarizing beam splitter 152. In the polarizing beam splitter 152, a P-polarized light component passes therethrough and is output to the outside of the system. On the other and, an S-polarized light component is reflected on the polarizing beam splitter 152, input to the liquid crystal display unit 151, reflected inside the liquid crystal display unit 151, and output from the liquid crystal display unit 151. Here, in the light output from the liquid crystal display unit 151, light beams output from pixels for displaying "white" contain the P-polarized light component in a high proportion, while light beams output from pixels for displaying "black" contain the S-polarized light component in a high proportion. So, of the light output from the liquid crystal display unit 151 and impinging on the polarizing beam splitter 152, the P-polarized light component passes through the polarizing beam splitter 152 and is guided to the optical system 112. On the other hand, the S-polarized light component is reflected on the polarizing beam splitter 152 and returned back to the light source 153. The optical system 112 is formed of a convex lens, for example, and in order to generate parallel light, the image forming unit 111 (more specifically, liquid crystal display unit 151) is disposed at a spot (position) of the focal distance in the optical system 112.

The frame 10 includes a front portion 11 disposed on the front of an observer, two temple portions 13 turnably attached to both ends of the front portion 11 via hinges 12, and earpiece portions (also referred to as tip cells, ear pieces, or ear pads) 14 attached to the tip ends of the respective temple portions 13. Further, nose pads (not shown) are attached to the frame 10. In other words, basically, the assembled body of the frame 10 and the nose pads has substantially the same structure as that of normal eyeglasses.

Furthermore, the casings 113 are detachably attached to the temple portions 13 with mounting members 19. The frame 10 is made of metal or plastic. It should be noted that each casing 113 may be attached to the temple portion 13 with the mounting member 19 so as not to be detached. Further, for an observer wearing his/her own eyeglasses, each casing 113 may be detachably attached to the temple portion of the frame of the eyeglasses owned by the observer with the mounting member 19. Each casing 113 may be attached to the outer side of the temple portion 13 or to the inner side of the temple portion 13.

Moreover, wires (signal line, power supply line, etc.) 15 extending from one image forming unit 111A are extended from the tip end of the earpiece portion 14 to the outside through the inside of the temple portion 13 and the earpiece portion 14 and are connected to a control device (control circuit) 18. Moreover, each of the image forming units 111A and 111B includes a headphone portion 16. Headphone portion wires 16', which extend from the respective image forming units 111A and 111B, are extended from the tip ends of the earpiece portions 14 to the headphone portions 16 through the inside of the temple portions 13 and the earpiece portions 14. More specifically, the headphone portion wire 16' is extended to the headphone portion 16 so as to run around the rear side of a pinna (auricle) from the tip end of the earpiece portion 14. Such a configuration can provide a neatly designed display apparatus without giving an impression on messy arrangement of the headphone portions 16 and the headphone portion wires 16'.

The wires (signal line, power supply line, etc.) 15 are connected to the control device (control circuit) 18 as described above. The control device 18 performs processing for image display. The control device 18 can be formed of a well-known circuit.

Further, an imaging device 17 including a solid-state imaging device and a lens (not shown) is attached to a central part 11' of the front portion 11 with an adequate mounting member (not shown). The solid-state imaging device is formed of a CCD or a CMOS sensor. A signal supplied from the imaging device 17 is transmitted to, for example, the image forming unit 111A via a wire (not shown) extended from the imaging device 17.

In general, an oscillation wavelength of the semiconductor laser element (wavelength λ output from the semiconductor laser element) shifts to the long wavelength side along with the temperature rise of the boding surface. When such a shift of the wavelength λ output from the semiconductor laser element to the long wavelength side occurs, as described above, the diffraction direction changes in accordance with the Bragg's condition represented by the expression (A), and thus a displacement occurs in an image observed by the observer. Incidentally, in the GaN-based semiconductor laser element formed by a laminate of the GaN-based compound semiconductor layer, along with the increase of a drive current, the oscillation wavelength of the semiconductor laser element (wavelength A output from the semiconductor laser element) shifts to the short wavelength side. So, it is possible to compensate for the shift of the oscillation wavelength of the semiconductor laser element to the long wavelength side along with the temperature rise. In other words, the temperature measuring unit 125 measures the temperature of the light source (semiconductor laser element) 153. In the case where the temperature change in the light source 153 falls within a predetermined range, the Bragg's condition is satisfied. In the case where the temperature change in the light source 153 departs from the predetermined range, the wavelength of light output from the light source 153 increases due to the heat generation of the light source 153. As a result, the Bragg's condition is not satisfied and the image quality of an image observed by the observer is deteriorated. In other words, a displacement occurs in an image observed by the observer. So, in the case where such a phenomenon occurs, under the control of the control unit 18, the drive current of the GaN-based semiconductor laser element that forms the light source 153 is increased, so that the wavelength of the light output from the light source 153 may be shifted to the short wavelength side and the original wavelength may be restored. It should be noted that a relationship between the temperature of the semiconductor laser element and the drive current may be obtained in advance and stored in the control unit 18.

As described above, since the image display device or display apparatus of Embodiment 1 includes the temperature measuring unit configured to measure the temperature of the image forming unit and the control unit configured to control the operation of the image forming unit based on a result of the temperature measurement by the temperature measuring unit, deterioration of the image quality of the image due to variations in wavelength of the light output from the light source can be certainly avoided.

Embodiment 2

Figure 6:
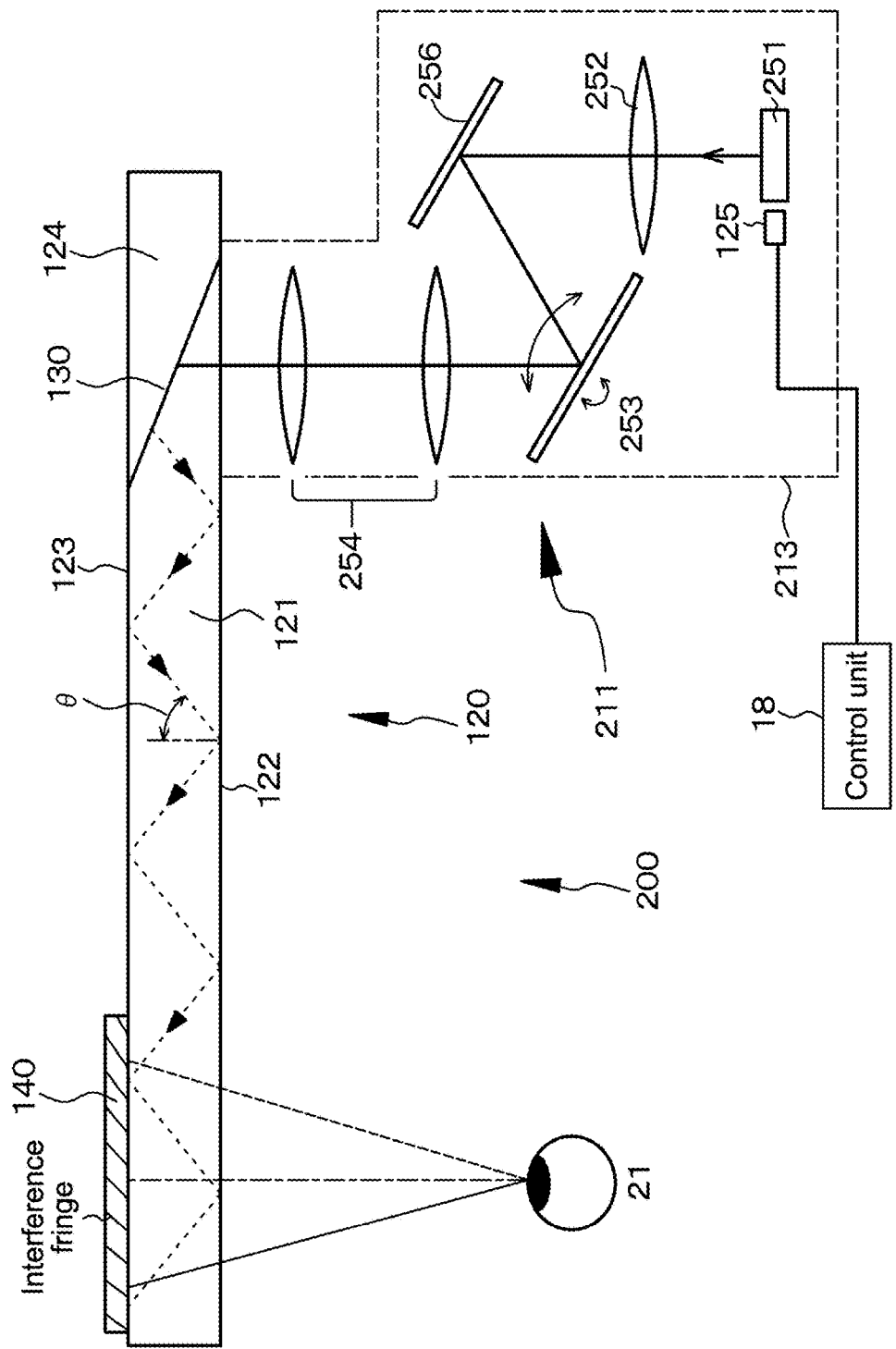
FIG. 6 is a conceptual diagram of an image display device in a display apparatus of Embodiment 2.

Embodiment 2 is a modification of Embodiment 1. As FIG. 6 shows a conceptual diagram of an image display device 200 in a display apparatus (head mounted display) of Embodiment 2, in Embodiment 2, an image forming unit 211 is formed of an image forming unit having a second configuration. In other words, the image forming unit 211 includes a light source 251 and a scanning unit 253 configured to scan parallel light output from the light source 251. More specifically, the image forming unit 211 includes (i) the light source 251, (ii) a collimating optical system 252 configured to change light output from the light source 251 into parallel light, (iii) the scanning unit 253 configured to scan the parallel light output from the collimating optical system 252, and (iv) a relay optical system 254 configured to relay the parallel light scanned by the scanning unit 253 for output therefrom. It should be noted that the entire image forming unit 211 is housed in a casing 213 (in FIG. 6, indicated by alternate long and short dash line). Such a casing 213 is provided with an opening (not shown), and light is output through the opening from the relay optical system 254. Each casing 213 is detachably attached to the temple portion 13 with the mounting member 19.

The light source 251 is formed of a GaN-based semiconductor laser element that emits green light, for example, as in Embodiment 1. The light output from the light source 251 is input to the collimating optical system 252 having a positive optical power as a whole and is output as parallel light. The parallel light is reflected on a total reflection mirror 256. Horizontal scanning and vertical scanning are performed by the scanning unit 253 including a MEMS. The MEMS includes a micromirror that is rotatable in two-dimensional directions and with which the incident parallel light can be scanned in a two-dimensional manner. By the scanning, the parallel light is converted into a kind of two-dimensional image, resulting in the generation of virtual pixels (the number of pixels is, for example, the same as in Embodiment 1). The light from the virtual pixels passes through the relay optical system (parallel light outputting optical system) 254 formed of a well-known relay optical system, and a light flux changed into parallel light is input to the optical unit 120.

The optical unit 120, to which the light flux changed into the parallel light in the relay optical system 254 is input, through which the light flux is guided, and from which the light flux is output, has the same configuration and structure as those of the optical unit described in Embodiment 1, and thus detailed description thereof will be omitted. Further, as described above, the display apparatus of Embodiment 2 also has substantially the same configuration and structure as those of the display apparatus of Embodiment 1 except for the difference on the image forming unit 211, and thus detailed description thereof will be omitted.

Embodiment 3

Embodiment 3 is a modification of Embodiments 1 and 2 and relates to an image display device according to the second embodiment. In the image display device of Embodiment 3, the image forming unit 111 or 211 includes a light source formed of a semiconductor laser element, the temperature measuring unit 125 is configured to measure a temperature of the semiconductor laser element, and the control unit 18 is configured to control an output position of light from the image forming unit 111 or 211.

Here, in the image display device of Embodiment 3, it is desirable to use a semiconductor laser element that emits red light as the semiconductor laser element, but the semiconductor laser element is not limited thereto. A green light-emitting semiconductor laser element that emits green light or a blue light-emitting semiconductor laser element that emits blue light may be used.

Specifically, in Embodiment 3 as well, the temperature measuring unit 125 measures the temperature of the light source (semiconductor laser element) 153 or 251. In the case where the temperature change in the light source 153 or 251 falls within a predetermined range, the Bragg's condition is satisfied. In the case where the temperature change in the light source 153 or 251 departs from the predetermined range, however, the wavelength of light output from the light source 153 or 251 increases due to the heat generation of the light source 153 or 251. As a result, the diffraction direction changes in accordance with the Bragg's condition and thus a displacement occurs in an image observed by the observer. So, in the case where such a phenomenon occurs, an image signal to be transmitted to the image forming unit 111 or 211 only needs to be compensated, to eliminate the displacement. More specifically, in order to move the image in a horizontal direction, a signal for changing the position of the image in the horizontal direction by +i pixels or −i pixels only needs to be generated as a display position correction signal in the control unit 18. Alternatively, a signal for changing a timing of a horizontal synchronizing signal by +i pixels or −i pixels only needs to be generated in the control unit 18. Further, in order to move the image in a vertical direction, a signal for changing the position of the image in the vertical direction by +j pixels or −j pixels only needs to be generated as a display position correction signal in the control unit 18. Alternatively, a signal for changing a timing of a vertical synchronizing signal by +j pixels or −j pixels only needs to be generated in the control unit 18. In other words, a memory read-out position of the image can be achieved by a delayed timing or advanced timing, or achieved by shifting the timings of the vertical synchronizing signal and the horizontal synchronizing signal. Then, a relationship between the temperature of the semiconductor laser element and the display position correction signal only needs to be obtained in advance and stored in the control unit 18, and in the control unit 18, a display position correction signal only needs to be added to an image signal for forming an image. Alternatively, in order to compensate for a distortion caused in an image output from the optical unit 120, a signal for compensating for a distortion caused in an image is superimposed on the image signal transmitted to the image forming unit 111 or 211, to remove the distortion. In other words, based on results of the detection by the temperature measuring unit 125, a signal for compensating for a distortion caused in an image, which is output from the optical unit 120, may be transmitted to the image forming unit 111 or 211.

Embodiment 4

Figure 7:
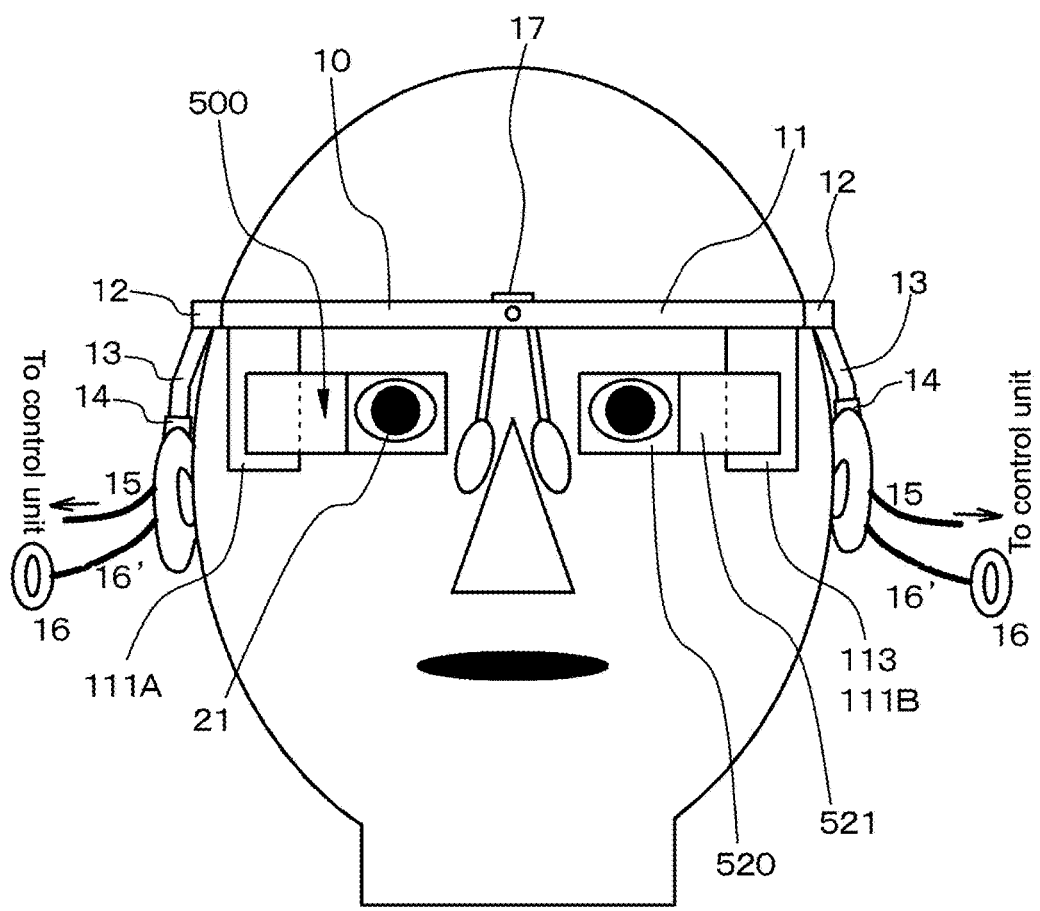
FIG. 7 is a schematic diagram of a display apparatus of Embodiment 4 when viewed from the front.
Figure 8:
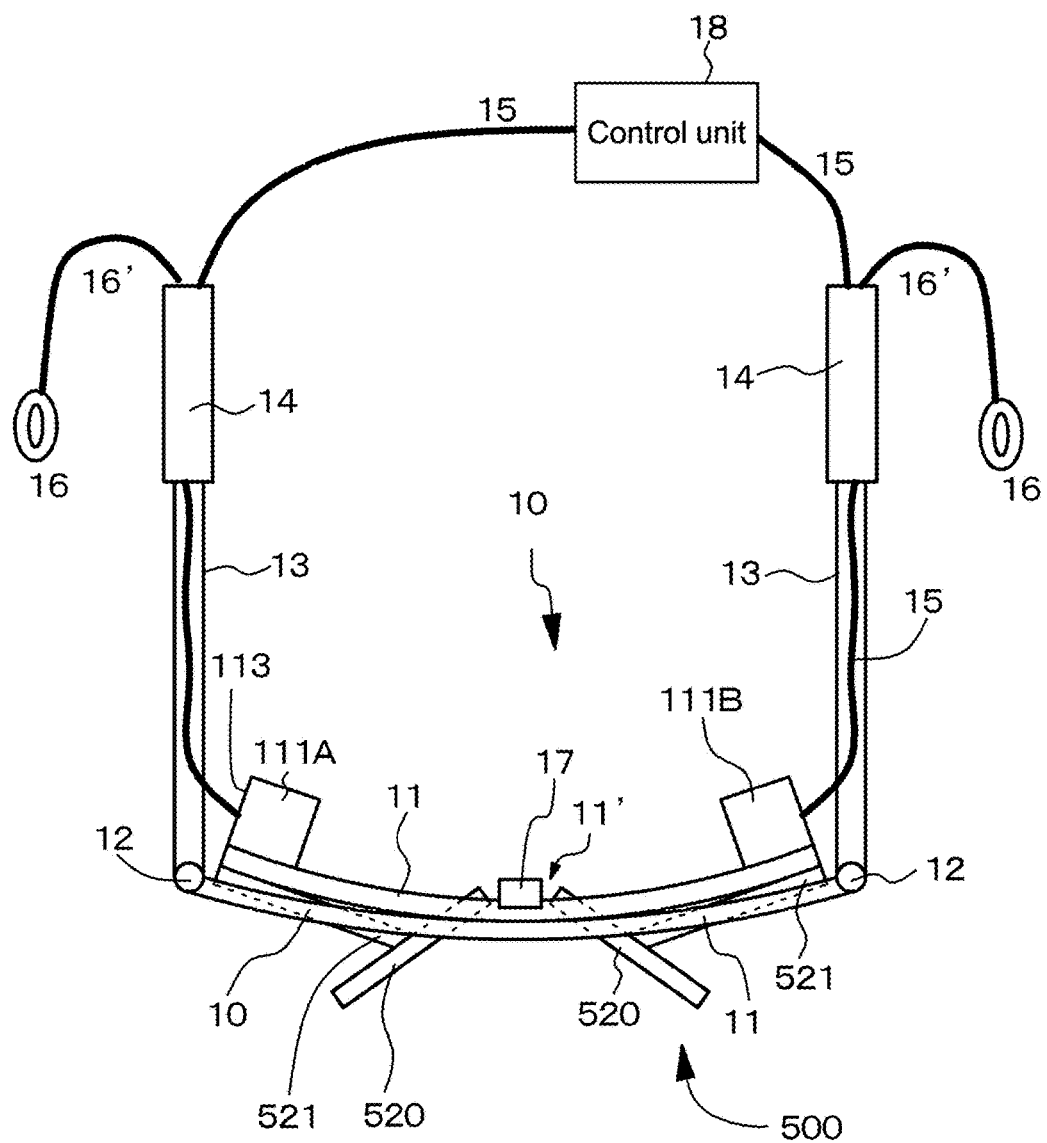
FIG. 8 is a schematic diagram of the display apparatus of Embodiment 4 when viewed from above.

Embodiment 4 is also a modification of the image display device and the optical unit of the display apparatus of Embodiments 1 to 3. FIG. 7 is a schematic diagram of a display apparatus of Embodiment 4 when viewed from the front, and FIG. 8 is a schematic diagram of the display apparatus when viewed from above.

In Embodiment 4, an optical unit 320 that forms the image display device 300 is formed of a semi-transmissive mirror. Light output from the image forming unit 111A or 111B is input to the semi-transmissive mirror and output therefrom toward a pupil 21 of an observer. A second deflection unit 140 is disposed in the optical unit 320. It should be noted that Embodiment 4 has a structure in which light output from each of the image forming units 111A and 111B is propagated inside a transparent member 321 made of a glass plate, a plastic plate, or the like and input to the optical unit 320 (semi-transmissive mirror), but may have a structure in which the light is propagated in air and input to the optical unit 320. Further, the image forming unit may be the image forming unit 211 described in Embodiment 2. Further, the light from the image forming unit 111 or 211 may be configured to reach the optical unit 320 via the first deflection unit 130, or the light from the image forming unit 111 or 211 may be configured to directly reach the optical unit 320.

Each of the image forming units 111A and 111B is attached to the front portion 11 with use of screws, for example. Further, the member 321 is attached to each of the image forming units 111A and 111B, and the optical unit 320 (semi-transmissive mirror) is attached to the member 321. The display apparatus of Embodiment 4 also has substantially the same configuration and structure as those of the display apparatuses of Embodiments 1 to 3 except for the difference described above, and thus detailed description thereof will be omitted.

Hereinabove, the present disclosure has been described based on the desirable embodiments, but the present disclosure is not limited to those embodiments. The configurations and structures of the display apparatuses (head mounted displays) and the image display devices described in the above embodiments are merely exemplary ones and can be appropriately modified. For example, a surface relief hologram (see U.S. Patent Application No. 20040062505A1) may be disposed on a light guide plate. In the optical unit, the diffraction grating element may be formed of the transmissive-type diffraction grating element. Alternatively, the diffraction grating element may be a reflection-type blazed diffraction grating element.

Information or data on an image displayed in the image forming unit may be stored in the display apparatus or may be recorded in a so-called cloud computer. In the latter case, when the display apparatus is provided with a communication unit, for example, with a mobile telephone or a smartphone, or when the display apparatus is combined with a communication unit, various types of information or data can be given and received or exchanged between the cloud computer and the display apparatus.

In the embodiments, the image forming unit 111 or 211 is described as one that displays a monochrome (for example, green) image, but the image forming unit 111 or 211 can also display a color image. In this case, the light source only needs to be formed of a light source that outputs red light, green light, and blue light, for example. Specifically, for example, red laser light, green laser light, and blue laser light that are output from a red light-emitting semiconductor laser element, a green light-emitting semiconductor laser element, and a blue light-emitting semiconductor laser element, respectively, may be used to achieve color mixture and uniformity in luminance by using a light pipe, to thus obtain white light. In the case where the light source is formed of the red light-emitting semiconductor laser element, the green light-emitting semiconductor laser element, and the blue light-emitting semiconductor laser element, for a red image formed by the red light-emitting semiconductor laser element, a position of the image output from the image forming unit may be controlled based on a result of the temperature measurement by the temperature measuring unit, and for a green image and a blue image formed by the green light-emitting semiconductor laser element and the blue light-emitting semiconductor laser element, respectively, positions of the images output from the image forming unit may be controlled based on a result of the temperature measurement by the temperature measuring unit, or the wavelength of light output from the light source may be controlled based on a result of the temperature measurement by the temperature measuring unit.

Figure 9:
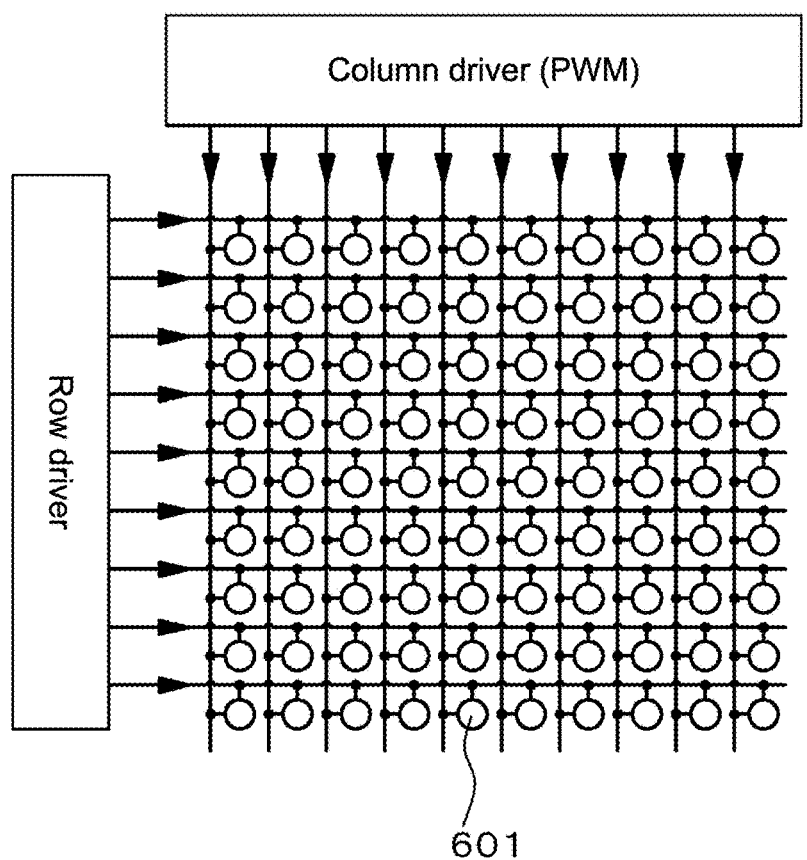
FIG. 9 is a conceptual diagram of a modification of an image forming unit.

As a modification of the image forming unit, for example, as FIG. 9 shows a conceptual diagram, it is possible to provide an active matrix type image forming unit including a light-emitting panel on which light-emitting elements 601 formed of semiconductor laser elements are arranged in a two-dimensional matrix. In the active matrix type image forming unit, the light-emitting/non-light-emitting states of the light-emitting elements 601 may be controlled and the light-emitting states of the light-emitting elements 601 may be directly observed, and thus an image may be displayed. Light output from this image forming unit is input to the light guide plate 121 via the collimating optical system 112. Also in the following description, the light-emitting element is formed of the semiconductor laser element.

Figure 10:
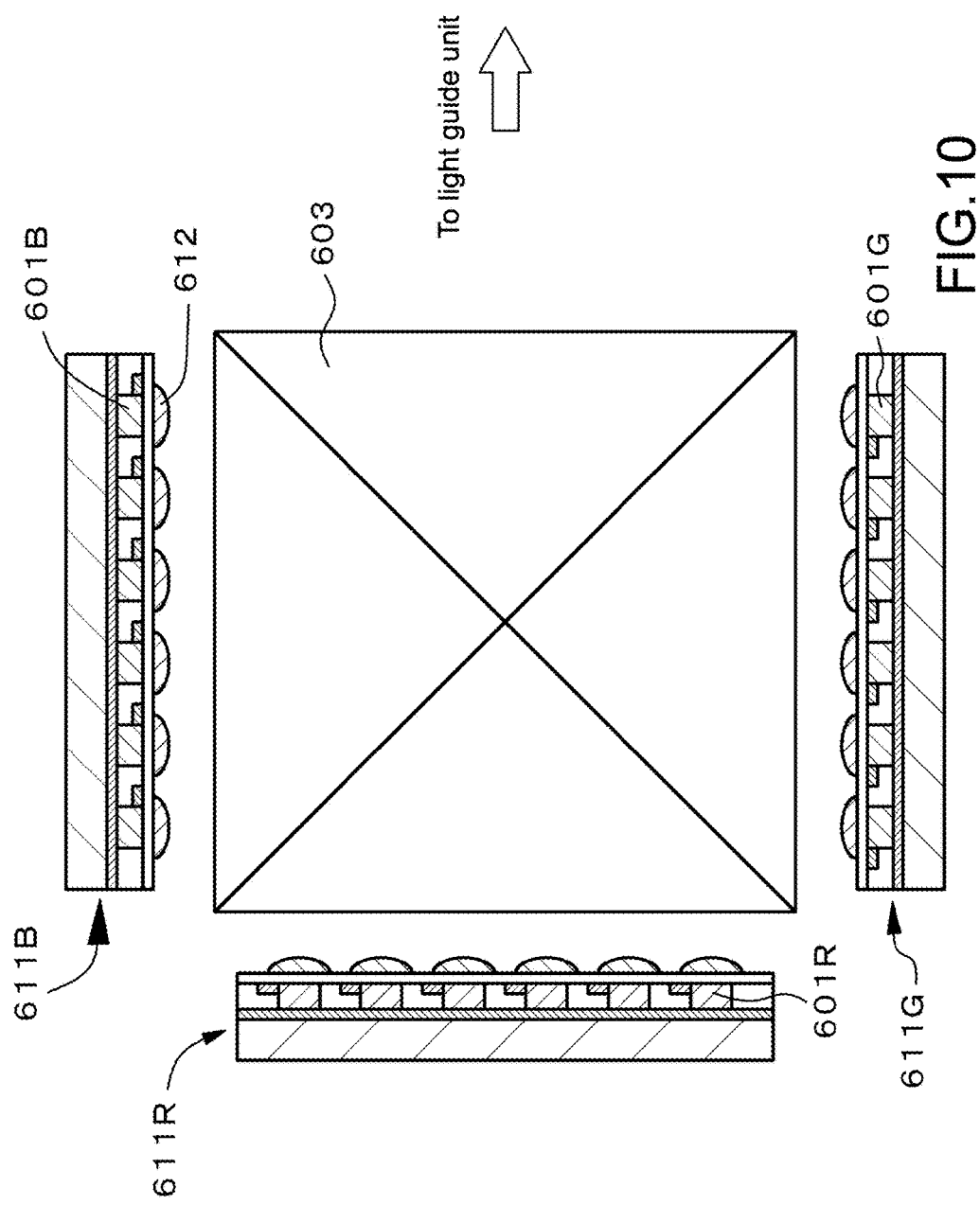
FIG. 10 is a conceptual diagram of another modification of the image forming unit.

Alternatively, as FIG. 10 shows a conceptual diagram, there may be provided an image forming unit for color display, including (α) a red light-emitting panel 611R on which red light-emitting elements 601R that emit red light are arranged in a two-dimensional matrix, (β) a green light-emitting panel 611G on which green light-emitting elements 601G that emit green light are arranged in a two-dimensional matrix, (γ) a blue light-emitting panel 611B on which blue light-emitting elements 601B that emit blue light are arranged in a two-dimensional matrix, and (δ) a unit for collecting light beams output from the respective red light-emitting panel 611R, green light-emitting panel 611G, and blue light-emitting panel 611B into one optical path (for example, dichroic prism 603), in which the light-emitting/non-light-emitting states of the red light-emitting elements 601R, the green light-emitting elements 601G, and the blue light-emitting elements 601B are controlled. The light output from the image forming unit is also input to the light guide plate 121 via the collimating optical system 112. It should be noted that microlenses 612 are configured to collect the light beams output from the light-emitting elements.

Figure 11:
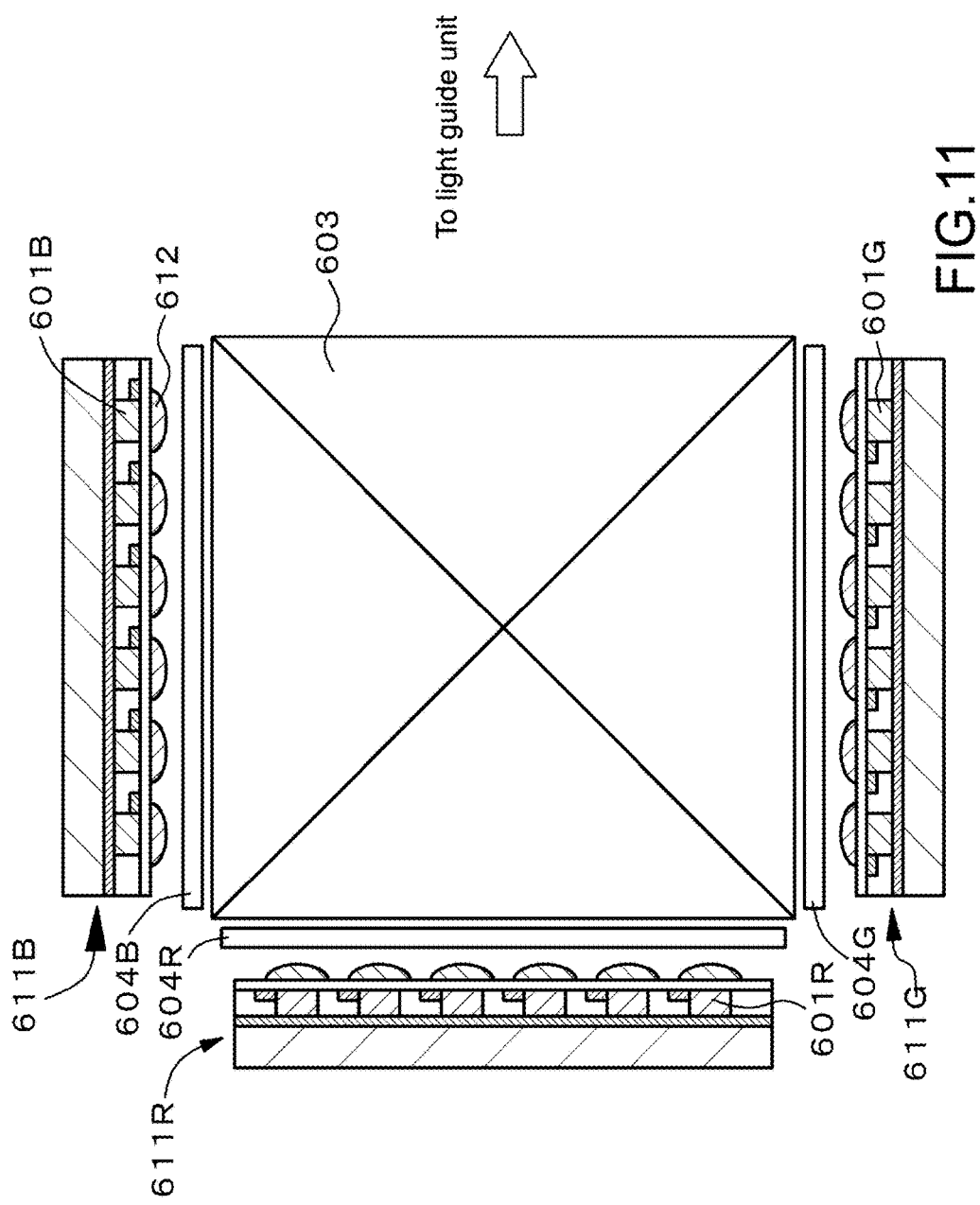
FIG. 11 is a conceptual diagram of still another modification of the image forming unit.

Alternatively, there may be provided an image forming unit including, as shown in FIG. 11 as a conceptual diagram, light-emitting panels 611R, 611G, and 611B on which light-emitting elements 601R, 601G, and 601B are arranged in a two-dimensional matrix, respectively. The passages/non-passages of light beams output from the light-emitting panels 611R, 611G, and 611B are controlled by light passage control devices 604R, 604G, and 604B, and the light beams are input to a dichroic prism 603. The optical paths of those light beams are collected into one optical path and input to the light guide plate 121 via the collimating optical system 112.

Figure 12:
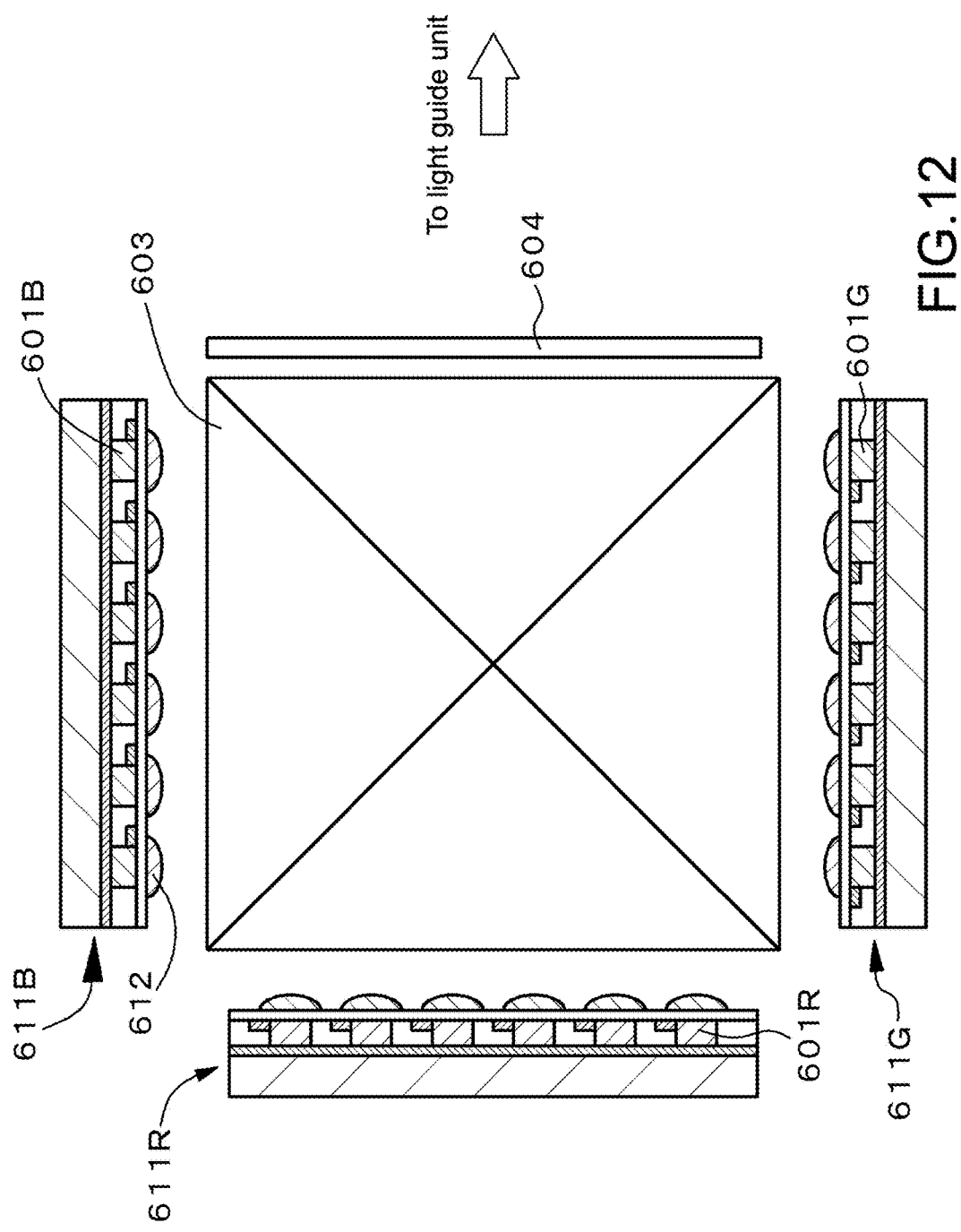
FIG. 12 is a conceptual diagram of still another modification of the image forming unit.

Alternatively, there may be provided an image forming unit including, as shown in FIG. 12 as a conceptual diagram, light-emitting panels 611R, 611G, and 611B on which light-emitting elements 601R, 601G, and 601B are arranged in a two-dimensional matrix, respectively. Light beams output from the light-emitting panels 611R, 611G, and 611B are input to a dichroic prism 603, and the optical paths of those light beams are collected into one optical path. The passages/non-passages of the light beams output from the dichroic prism 603 are controlled by a light passage control device 604, and the light beams are input to the light guide plate 121 via the collimating optical system 112.

Figure 13:
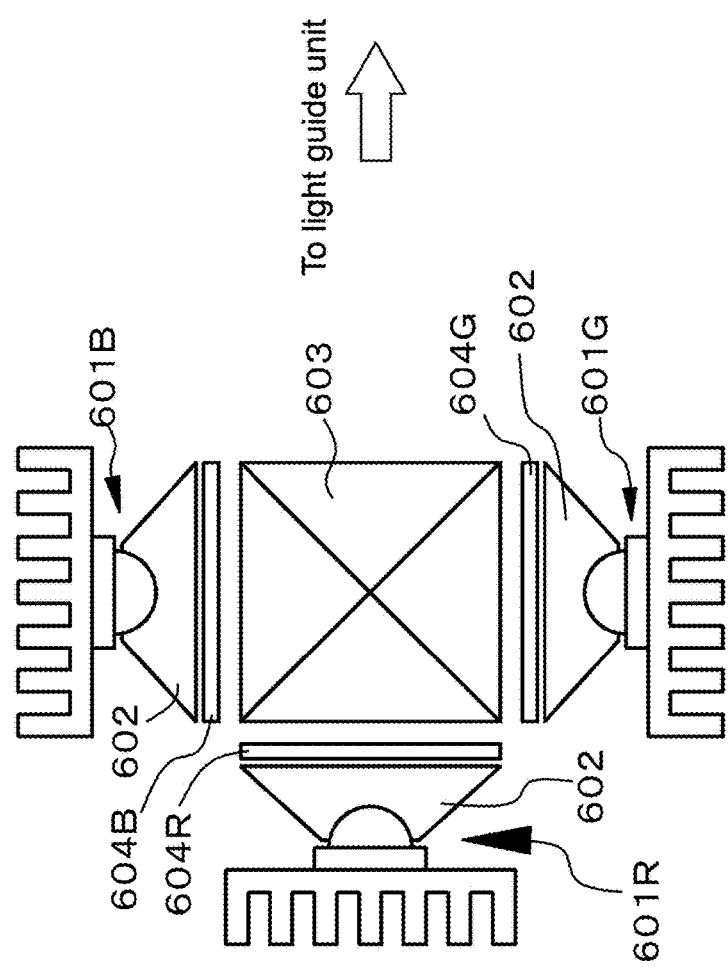
FIG. 13 is a conceptual diagram of still another modification of the image forming unit.

Alternatively, there may be provided an image forming unit including, as shown in FIG. 13: a light-emitting element 601R that emits red light; a light passage control device (for example, liquid crystal display unit 604R) as a kind of light valve, configured to control the passage/non-passage of output light output from the light-emitting element 601R that emits red light; a light-emitting element 601G that emits green light; a light passage control device (for example, liquid crystal display unit 604G) as a kind of light valve, configured to control the passage/non-passage of output light output from the light-emitting element 601G that emits green light; a light-emitting element 601B that emits blue light; a light passage control device (for example, liquid crystal display unit 604B) as a kind of light valve, configured to control the passage/non-passage of output light output from the light-emitting element 601B that emits green light; light leading members 602 configured to lead the light beams output from the light-emitting elements 601R, 601G, and 601B; and a unit for collecting the light beams into one optical path (for example, dichroic prism 603). Those light beams output from the dichroic prism 603 are input to the light guide plate 121 via the collimating optical system 112.

It should be noted that the present disclosure can have the following configurations.

[A01] (Image Display Device)

An image display device, including:

(A) an image forming unit;

(B) an optical unit configured to input and output light that is output from the image forming unit;

(C) a temperature measuring unit configured to measure a temperature of the image forming unit; and (D) a control unit configured to control an operation of the image forming unit based on a result of a temperature measurement by the temperature measuring unit.

[A02] (Image Display Device According to First Embodiment)

The image display device according to [A01], in which the image forming unit includes a light source including a GaN-based semiconductor laser element, the temperature measuring unit is configured to measure a temperature of the semiconductor laser element, and the control unit is configured to control a wavelength of the semiconductor laser element.

[A03] The image display device according to [A02], in which the control unit is configured to control a current supplied to the semiconductor laser element to thus control the wavelength of the semiconductor laser element.

[A04] The image display device according to [A02] or [A03], in which the semiconductor laser element is configured to emit one of green light and blue light.

[A05] (Image Display Device According to Second Embodiment)

The image display device according to [A01], in which the image forming unit includes a light source including a semiconductor laser element, the temperature measuring unit is configured to measure a temperature of the semiconductor laser element, and the control unit is configured to control an output position of the light from the image forming unit.

[A06] The image display device according to [A05], in which the semiconductor laser element is configured to emit red light.

[A07] The image display device according to [A01], in which the image forming unit includes a light source including a semiconductor laser element, the temperature measuring unit is configured to measure a temperature of the semiconductor laser element, and the control unit is configured to transmit a signal for compensating for a distortion to the image forming unit, the distortion being caused in an image output from the optical unit.

[A08] The image display device according to any one of [A01] to [A07], in which the optical unit includes (a) a light guide plate configured to output light after input light is propagated inside the light guide plate by total reflection, (b) a first deflection unit including one of a reflecting mirror and a semi-transmissive mirror and configured to deflect at least part of the light input to the light guide plate, to totally reflect the light input to the light guide plate inside the light guide plate, and (c) a second deflection unit including a diffraction grating member and configured to deflect the light propagated inside the light guide plate by total reflection, to output, from the light guide plate, the light propagated inside the light guide plate by total reflection.

[B01] (Display Apparatus)

A display apparatus, including:

(i) a frame mounted onto a head of an observer; and (ii) an image display device attached to the frame, the image display device including (A) an image forming unit, (B) an optical unit configured to input and output light that is output from the image forming unit, (C) a temperature measuring unit configured to measure a temperature of the image forming unit, and (D) a control unit configured to control an operation of the image forming unit based on a result of a temperature measurement by the temperature measuring unit.

[B02] (Display Apparatus)

A display apparatus, including:

(i) a frame mounted onto a head of an observer; and (ii) an image display device attached to the frame, the image display device including the image display device according to any one of [A01] to [A08].

It should be understood by those skilled in the art that various modifications, combinations, sub-combinations and alterations may occur depending on design requirements and other factors insofar as they are within the scope of the appended claims or the equivalents thereof.

What is claimed is:

1. An image display device, comprising:
an image forming section comprising a light source configured to generate light, wherein the light source comprises a GaN-based semiconductor laser element;
an optical section configured to input and output light that is output from the image forming section, the optical section comprising:
  a light guide plate configured to output light after input light is propagated inside the light guide plate by total reflection,
  a first deflector configured to deflect at least part of the light input to the light guide plate, to totally reflect the light input to the light guide plate inside the light guide plate, and
  a second deflector including a diffraction grating member configured to deflect the light propagated inside the light guide plate by total reflection, to output, from the light guide plate, the light propagated inside the light guide plate by total reflection;
a temperature measuring section configured to measure a temperature of the image forming section; and
control circuitry configured to modify: based on a result of a temperature measurement by the temperature measurement section, a display position encoded in an image signal provided to the image forming section when the result of the temperature measurement is outside of a predetermined range; and control a current supplied to the semiconductor laser element to thus control a wavelength of the semiconductor laser element based on the temperature measurement.

2. The image display device according to claim 1, wherein the semiconductor laser element is configured to emit one of green light and blue light.

3. The image display device according to claim 1, wherein the semiconductor laser element is configured to emit red light.

4. The image display device according to claim 1, wherein the first deflector comprises one of a reflecting mirror and a semi-transmissive mirror.

5. The image display device according to claim 1, wherein the diffraction grating member of the second deflector is formed of at least two diffraction grating layers formed of diffraction gratings.

6. The image display device according to claim 1, wherein the control circuitry is configured to modify the display position encoded in the image signal, based on the result of the temperature measurement by the temperature measuring section, by superimposing, on the image signal, a display position correction signal to change the display position by a number of pixels.

7. The image display device according to claim 1, wherein the control circuitry is configured to control a timing of a vertical or horizontal synchronization signal based on the result of the temperature measurement by the temperature measuring section.

8. A display apparatus, comprising:
a frame mounted onto a head of an observer; and
an image display device attached to the frame, the image display device including
- an image forming section comprising a light source configured to generate light, wherein the light source comprises a GaN-based semiconductor laser element,
- an optical section configured to input and output light that is output from the image forming section, the optical section comprising:
  - a light guide plate configured to output light after input light is propagated inside the light guide plate by total reflection,
  - a first deflector configured to deflect at least part of the light input to the light guide plate, to totally reflect the light input to the light guide plate inside the light guide plate, and
  - a second deflector including a diffraction grating member configured to deflect the light propagated inside the light guide plate by total reflection, to output, from the light guide plate, the light propagated inside the light guide plate by total reflection
- a temperature measuring section configured to measure a temperature of the image forming section, and
- control circuitry configured to modify: based on a result of a temperature measurement by the temperature measurement section, a display position encoded in an image signal provided to the image forming section when the result of the temperature measurement is outside of a predetermined range; and control a current supplied to the semiconductor laser element to thus control a wavelength of the semiconductor laser element based on the temperature measurement.

9. An image display device, comprising:
an image forming section including
- a liquid crystal display section, and
- a light source configured to generate light, wherein the light source comprises a GaN-based semiconductor laser element;
an optical section configured to input and output light that is output from the image forming section, the optical section comprising:
- a light guide plate configured to output light after input light is propagated inside the light guide plate by total reflection,
- a first deflector configured to deflect at least part of the light input to the light guide plate, to totally reflect the light input to the light guide plate inside the light guide plate, and
- a second deflector including a diffraction grating member configured to deflect the light propagated inside the light guide plate by total reflection, to output, from the light guide plate, the light propagated inside the light guide plate by total reflection;
a temperature measuring section configured to measure a temperature of the light source; and
control circuitry configured to: modify, based on a result of a temperature measurement by the temperature measurement section, a display position encoded in an image signal provided to the image forming when the result of the temperature measurement is outside of a predetermined range; and control a current supplied to the semiconductor laser element to thus control a wavelength of the semiconductor laser element based on the temperature measurement.

10. The image display device according to claim 9, wherein
the first deflector comprises one of a reflecting mirror and a semi-transmissive mirror.

11. The image display device according to claim 9, wherein the diffraction grating member of the second deflector is formed of at least two diffraction grating layers formed of diffraction gratings.

12. The image display device according to claim 9, wherein the control circuitry is configured to modify the display position encoded in the image signal section, based on the result of the temperature measurement by the temperature measuring section, by superimposing, on the image signal, a display position correction signal to change the display position by a number of pixels.

13. The image display device according to claim 9, wherein the control circuitry is configured to control a timing of a vertical or horizontal synchronization signal based on the result of the temperature measurement by the temperature measuring section.

14. The image display device according to claim 9, wherein the diffraction grating member of the second deflector is formed of at least two diffraction grating layers formed of diffraction gratings.

* * * * *